(12) United States Patent
Yasuda et al.

(10) Patent No.: US 6,904,221 B2
(45) Date of Patent: Jun. 7, 2005

(54) OPTICAL DEVICE, AND OPTICAL TRANSCEIVER AND OTHER OPTICAL APPARATUSES USING THE OPTICAL DEVICE

(75) Inventors: Naru Yasuda, Kyoto (JP); Yukari Terakawa, Kyoto (JP); Hayami Hosokawa, Kyoto (JP)

(73) Assignee: Omron Corporation (JP)

( * ) Notice: Subject to any disclaimer, the term of this patent is extended or adjusted under 35 U.S.C. 154(b) by 189 days.

(21) Appl. No.: 10/128,475

(22) Filed: Apr. 23, 2002

(65) Prior Publication Data

US 2002/0154879 A1 Oct. 24, 2002

(30) Foreign Application Priority Data

Apr. 23, 2001 (JP) ........................................ 2001-124960
Feb. 12, 2002 (JP) ........................................ 2002-034169

(51) Int. Cl.[7] .............................. G02B 6/10; G02B 6/12; G02B 6/26
(52) U.S. Cl. ........................ 385/132; 385/129; 385/14; 385/50
(58) Field of Search ................................. 385/14, 31, 39, 385/49, 50, 42–45, 128–132

(56) References Cited

U.S. PATENT DOCUMENTS

| 5,009,477 | A | | 4/1991 | Alferness et al. | |
|---|---|---|---|---|---|
| 5,201,018 | A | | 4/1993 | Coden et al. | |
| 5,636,298 | A | | 6/1997 | Jiang et al. | |
| 5,887,097 | A | * | 3/1999 | Henry et al. | .................. 385/39 |
| 5,943,463 | A | | 8/1999 | Unuma et al. | |
| 6,385,375 | B1 | | 5/2002 | Goto | ............................ 385/49 |
| 6,433,942 | B1 | | 8/2002 | Memezawa et al. | |
| 6,501,876 | B1 | | 12/2002 | Okada et al. | |
| 2002/0126402 | A1 | | 9/2002 | Memezawa et al. | |

FOREIGN PATENT DOCUMENTS

| DE | 44 11 860 A1 | 10/1995 |
|---|---|---|
| JP | 4-302481 | 10/1992 |
| JP | 5-215927 | 8/1993 |
| JP | 6-308341 | 11/1994 |
| JP | 6-324367 | 11/1994 |
| JP | 2001-133645 | 5/2001 |

OTHER PUBLICATIONS

Patent Abstracts of Japan Publication No. 05–215927, dated Aug. 27, 1993, 1 page.
Patent Abstracts of Japan Publication No. 06–308341, dated Nov. 4, 1994, 1 page.
Patent Abstracts of Japan Publication No. 06–324367, dated Nov. 25, 1994, 1 page.
Patent Abstracts of Japan, Publication No. 04–302481 dated Oct. 26, 1992, 2 pgs.
Partial European Search Report issued in European Application No. EP 02 25 2857 dated Mar. 2, 2004, 6 pgs.

* cited by examiner

*Primary Examiner*—Akm Enayet Ullah
*Assistant Examiner*—Kevin S. Wood
(74) *Attorney, Agent, or Firm*—Osha Liang LLP

(57) ABSTRACT

A second light guide is formed by filling, with a core material, a groove that is formed on the top surface of a reception-side substrate. A first light guide is formed by filling, with a core material, a groove that is formed on the bottom surface of a sending-side substrate. The reception-side substrate and the sending-side substrate are bonded to each other with a cladding layer interposed in between so that the second light guide and the first light guide are isolated from each other optically.

11 Claims, 35 Drawing Sheets

(a)

(b)

OPTICAL DEVICE, AND OPTICAL TRANSCEIVER AND OTHER OPTICAL APPARATUSES USING THE OPTICAL DEVICE

BACKGROUND OF INVENTION

The present invention relates to an optical device, and an optical transceiver and other optical apparatuses using the optical device. For example, the invention relates to optical apparatuses such as an optical transceiver and a dual core/single core converter that are capable of bidirectional optical communication, that is, capable of sending and receiving an optical signal, as well as to an optical device for light wave guidance used in those apparatuses.

With the recent development of high-speed, large-capacity communication networks, communication control equipment, etc., the communication using optical fibers has become the mainstream. For example, such terminals as information appliances provided in homes can send and receive a signal if they are connected to a communication network such as the Internet via optical fibers. Optical fibers are also often used in interconnecting a personal computer, a TV, a DVD player, a video game machine, etc. in a home. For those reasons, less expensive, compact, and highly efficient optical transceivers that can also be used in information appliances etc. are now desired.

Such an optical transceiver is disclosed in Japanese Patent Laid-Open No. 149008/1983, for example. FIG. 1 is a perspective view showing the structure of an optical device 1A that is used in this optical transceiver. The optical device 1A is produced in the following manner. Two mold plates 2 each formed with a Y-shaped groove are laid on each other to form a Y-shaped cavity 3 inside. Transparent resin is poured into the cavity 3 to form a light guide 4.

Where the optical device 1A is used as part of an optical transceiver 1, as shown in FIG. 2, a light input element 5 and a light-receiving element 6 are opposed to the respective branch-side end faces of the light guide 4 and the end face of an optical fiber 7 is opposed to the other end face of the light guide 4. If an optical signal A is output from the light input element 5, the optical signal A enters the light guide 4 through its end face and then irradiates on the optical fiber 7 from the end face of the light guide 4 located on the other side as indicated by solid-line arrows in FIG. 2. On the other hand, if an optical signal B that has traveled through the optical fiber 7 is output from the end face of the optical fiber 7, the optical signal B enters the light guide 4 through its end face and is then received by the light-receiving element 6 located on the other side of the optical device 4 as indicated by broken-line arrows in FIG. 2.

However, in the light guide 4 having the above structure, since there is a light guide portion that is shared by the sending light guide and the receiving light guide, part of the optical signal A that is output from the light input element 5 is reflected by the end face of the light guide 4 and a resulting return optical signal a1 enters the light-receiving element 6 to cause crosstalk. Further, if part of the optical signal A that has been output from the light input element 5, traveled through the light guide 4, and been output from the other end face of the light guide 4 is reflected by the end face of the optical fiber 7, a reflection optical signal a2 returns to the light guide 4 and enters the light-receiving element 6 to also cause crosstalk. If the transmission distance is sufficiently long, a reception light quantity of a primary reception signal can no longer be distinguished from that of crosstalk, which disables bidirectional communication.

In the optical device 1A or an optical transceiver 1 having the above structure, the light guide 4 is formed by pouring transparent resin into the cavity 3 of the mold plates 2. However, it is difficult to register the grooves of the respective mold plates 2 with each other with high accuracy. Further, as the diameter of the cavity 3 decreases, it becomes more difficult to pour transparent resin into the cavity 3; that is, it becomes more difficult to produce the optical device 1A with high accuracy.

Japanese Patent Laid-Open No. 2000-162455 discloses an optical transceiver capable of preventing crosstalk. As shown in FIG. 3, in this optical transceiver 8, a sending light guide 10 and a receiving light guide 11 are provided on the surface of a silicon substrate 9. To prevent crosstalk, a groove (gap) 12 is formed between the light guides 10 and 11.

However, in the optical transceiver 8 having the above structure, since the sending light guide 10 and the receiving light guide 11 are formed on the silicon substrate 9 by using a semiconductor manufacturing process, complex manufacturing steps are needed and the manufacturing cost becomes high. Further, it is difficult to form thick light guides 10 and 11 and hence their end faces to be opposed to an optical fiber 3 cannot obtain large areas, resulting in low efficiency of light utilization.

SUMMARY OF INVENTION

In one aspect, the present invention relates to an optical device having a novel structure, and an optical transceiver and other optical apparatuses using such an optical device.

In another aspect, the invention simplifies the structure of an optical device for light guidance and its manufacturing process, and to prevent interference between different light guides of the optical device without lowering the efficiency of light utilization.

An optical device according to the invention comprises a first substrate that is formed with a first light guide; and a second substrate that is formed with a second light guide, wherein the first substrate and the second substrate are laid on and integrated with each other in such a manner that the first light guide and the second light guide are isolated from each other optically, and wherein an end face of the first light guide and an end face of the second light guide are located adjacent to each other in a direction perpendicular to the first substrate or the second substrate.

This optical device has a simple lamination structure in which the first substrate and the second substrate are laid on and integrated with each other in such a manner that the first light guide and the second light guide are isolated from each other optically rather than connected to each other. As a result, the manufacturing process can be simplified and the cost can be reduced.

In this optical device, since the end faces of the first light guide and the second light guide are located adjacent to each other in the direction perpendicular to the first substrate or the second substrate, the areas of the end faces of the first light guide and the second light guide can be made sufficiently large with respect to the optical fiber diameter, which increases the efficiency of light utilization and enables long-distance transmission. Further, since the first substrate and the second substrate are laid on and integrated with each other in such a manner that the first light guide and the second light guide are isolated from each other optically, the interference between the first light guide and the second light guide can be prevented effectively.

In the above optical device, a plurality of light guide pairs each consisting of the first light guide and the second light guide may be provided. This optical device may be such that only the first light guides are provided on one substrate and only the second light guides are provided on the other substrate. Alternatively, first light guides and second light guides may be provided on each substrate in mixture.

According to an embodiment of the above optical device, the first light guide and the second light guide is isolated from each other optically by interposing an isolation layer between one major surface of the first substrate and one major surface of the second substrate. With this structure, the first light guide and the second light guide can easily be isolated from each other optically and hence the interference between them can be prevented merely by interposing an isolation layer between the first light guide and the second light guide in laying those on each other. Since such an isolation layer can be a very thin film, the interference between the first light guide and the second light guide can be prevented without sacrificing the efficiency of light utilization. The isolation layer may be a cladding layer that is smaller in refractive index than the core material, a light reflection layer, an air layer, or the like. The isolation layer may be composed of a plurality of layers. In particular, where an air layer is used as the isolation layer, the difference in refractive index between the first or second light guide and the isolation layer is increased, which enhances the effect of confining light in the first or second light guide.

According to another embodiment of the above optical device, the first light guide is formed by filling, with a core material, a groove that is formed on one major surface of the first substrate, and the second light guide is formed by filling, with a core material, a groove that is formed on one major surface of the second substrate. Therefore, the first light guide and the second light guide can be formed by molding a first substrate and a second substrate each having a groove by a resin molding method such as injection molding and then filling the grooves with a core material. In this manner, the first light guide and the second light guide can easily be produced on a mass-production basis. By virtue of a simple lamination structure, the manufacturing process of this optical device can be simplified and its cost can be reduced.

According to another embodiment of the above optical device, in an optical-fiber-coupling end surface where the end face of the first light guide and the end face of the second light guide are located adjacent to each other in the direction perpendicular to the first substrate or the second substrate, a central axis of the first light guide or the second light guide that is perpendicular to the first substrate or the second substrate approximately coincides with a central axis of an optical fiber that is perpendicular to the first substrate or the second substrate. Where the width of a wider one of the first light guide and the second light guide is greater than the diameter of the optical fiber, the optical fiber can be coupled with the wider optical guide with a small deviation merely by registering the central axis of the optical fiber with that of the narrower optical guide. The optical fiber coupling work can thus be facilitated.

According to another embodiment of the above optical device, in the optical-fiber-coupling end surface, the central axis of the first light guide that is perpendicular to the first substrate or the second substrate approximately coincides with the central axis of the second light guide that is perpendicular to the first substrate or the second substrate. This structure allows a wide range of variation of the optical fiber connecting position and hence facilitates the work of coupling the optical fiber with the optical device.

According to still another embodiment of the above optical device, the first light guide is a sending light guide and the second light guide is a receiving light guide. Therefore, this optical device can be used as part of an optical transceiver or the like by coupling a light input element and a light-receiving element with the other end faces of the first light guide and the second light guide, respectively. Further, in this optical device, since the sending light guide as the first light guide and the receiving light guide as the second light guide are isolated from each other optically, there is no fear that an optical signal traveling through the sending light guide leaks to the receiving light guide and crosstalk between the sending light guide and the receiving light guide can be prevented.

According to yet another embodiment of the above optical device, at least part of the receiving light guide or the sending light guide is provided with a region where air is used as a cladding layer. In this region, light traveling through the light guide can be bent by a large angle by total reflection. This increases the degree of design freedom and thereby enables miniaturization of the optical device.

According to a further embodiment of the above optical device, a light beam is coupled with a light-input-element-coupling face of the sending light guide in such a manner that a minor axis of a cross-section of the light beam is perpendicular to a joining surface of the first substrate and the second substrate. With this structure, light that is output from the sending light guide and reflected by the end face of the optical fiber on the optical fiber coupling side is less prone to enter the receiving light guide. This further enhances the crosstalk suppressing effect.

An optical device according to another aspect of the invention comprises a substrate having a groove; a first light guide that is formed in the groove; and a second light guide that is laid on a surface of the substrate. Since the outer circumferential surfaces of the second light guide excluding the surface opposed to the substrate have air cladding, the effect of confining traveling light in the second light guide by total reflection is high. In particular, light hardly leaks from the second light guide even if the second light guide is bent with large curvature.

According to a further embodiment of the above optical device, the second light guide is a prism. Therefore the traveling direction of light that travels through the second light guide can be changed to a large extent because it is a prism. Therefore, where this optical device is used as a transceiver or the like, a light input element and a light-receiving element can be separated from each other and hence there is no fear that interference occurs between them. The light input element and the light-receiving element can be disposed easily.

An optical device according to another aspect of the invention comprises a first substrate that is formed with a sending light guide; and a second substrate that is formed with a receiving light guide that is smaller in refractive index than the sending light guide, wherein the first substrate and the second substrate are laid on and integrated with each other in such a manner that at least end portions of the sending light guide and the receiving light guide are in contact with each other.

In this optical device, the sending light guide and the receiving light guide are partially in contact with each other. However, since the refractive index of the sending light guide is greater than that of the receiving light guide, the leakage of a transmission signal from the sending light guide to the receiving light guide can be prevented though there is fear that a reception signal may leak from the receiving light guide to the sending light guide. Therefore, crosstalk can be prevented that would otherwise occur due to leakage of a transmission signal from the sending light guide to the receiving light guide. If a reception signal leaks to the sending light guide, the reception signal attenuates to lower the efficiency. However, this does not result in crosstalk.

An optical device according to still another aspect of the invention comprises a substrate; a first light guide formed by filling, with a core material, a groove that is formed on one major surface of the substrate; and a second light guide formed by filling, with a core material, a groove that is formed on the other major surface of the substrate, wherein an end face of the first light guide and an end face of the second light guide are located adjacent to each other in a direction perpendicular to the substrate.

This optical device has a simple configuration because the first light guide and the second light guide are formed on front and rear of a single substrate. With a simple lamination structure, the manufacturing process of this optical device can be simplified and its cost can be reduced.

Further, in this optical device, since the end faces of the first light guide and the second light guide are located adjacent to each other in the direction perpendicular to the first substrate or the second substrate, the areas of the end faces of the first light guide and the second light guide can be made sufficiently large with respect to the optical fiber diameter, whereby the efficiency of light utilization can be increased and long-distance transmission is enabled. Still further, since the first light guide and the second light guide are isolated from each other optically, the interference between them can be prevented effectively.

In the above optical device, a plurality of light guide pairs each consisting of the first light guide and the second light guide may be provided. This optical device may be such that only the first light guides are provided on one major surface and only the second light guides are provided on the other major surface. Alternatively, first light guides and second light guides may be provided on each major surface in mixture.

An optical transceiver according to the invention comprises an optical device according to the invention; a light input element disposed so as to be opposed to an end face of the first light guide; and a light-receiving element disposed so as to be opposed to an end face of the second light guide.

Using the optical device according to the invention, this optical transceiver has a simple lamination structure. As a result, the manufacturing process can be simplified and the cost can be reduced. Further, in this optical transceiver, since the end faces of the first light guide and the second light guide are located adjacent to each other in the direction perpendicular to the first substrate or the second substrate, the areas of the end faces of the first light guide and the second light guide can be made sufficiently large with respect to the optical fiber diameter, which increases the efficiency of light utilization and enables long-distance transmission. Still further, since the first substrate and the second substrate are laid on and integrated with each other in such a manner that the first light guide and the second light guide are isolated from each other optically, the interference between the first light guide and the second light guide can be prevented effectively.

A connector according to the invention comprises an optical device according to the invention wherein an end face of the first light guide and an end face of the second light guide are located adjacent to each other in a direction perpendicular to the substrate; and an optical fiber that is coupled with the optical device in such a manner as to be opposed to a portion where the end face of the first light guide and the end face of the second light guide are located adjacent to each other.

This connector makes it possible to transmit a transmission signal and a reception signal with a single-core optical fiber by connecting the other end faces of the sending light guide and the receiving light guide to a connector of an optical transceiver or the like.

A twin core/single core conversion adapter according to the invention comprises an optical device according to the invention wherein one end face of the first light guide and an end face of the second light guide are located adjacent to each other in a direction perpendicular to the substrate; a first optical fiber that is coupled with the optical device in such a manner as to be opposed to a portion where the one end face of the sending light guide and the one end face of the receiving light guide are located adjacent to each other; and a second optical fiber that is coupled with the optical device in such a manner as to be opposed to the other end face of the sending light guide; a third optical fiber that is coupled with the optical device in such a manner as to be opposed to the other end face of the receiving light guide; and a connecting portion to be connected to a twin-core connection cord, the connecting portion being provided at least in a coating portion where the optical device is sealed.

This twin core/single core conversion adapter makes it possible to connect a twin-core cord and a single-core cord to each other by connecting the second and third optical fibers to the twin-core cord and connecting the first optical fiber to the single-core cord. That is, "conversion" from a twin-core cord to a single-core cord is enabled.

Since the above optical transceiver, connector, and twin core/single core conversion adapter make it possible to transmit light in both of a sending direction and a receiving direction with a single-core optical fiber, the cost of the optical fiber can be reduced and the bulk of the optical device can be reduced, which makes its handling easier.

The above-described elements of the invention can be combined with each other in every possible manner.

DETAILED DESCRIPTION

Embodiment 1

Figure 4:
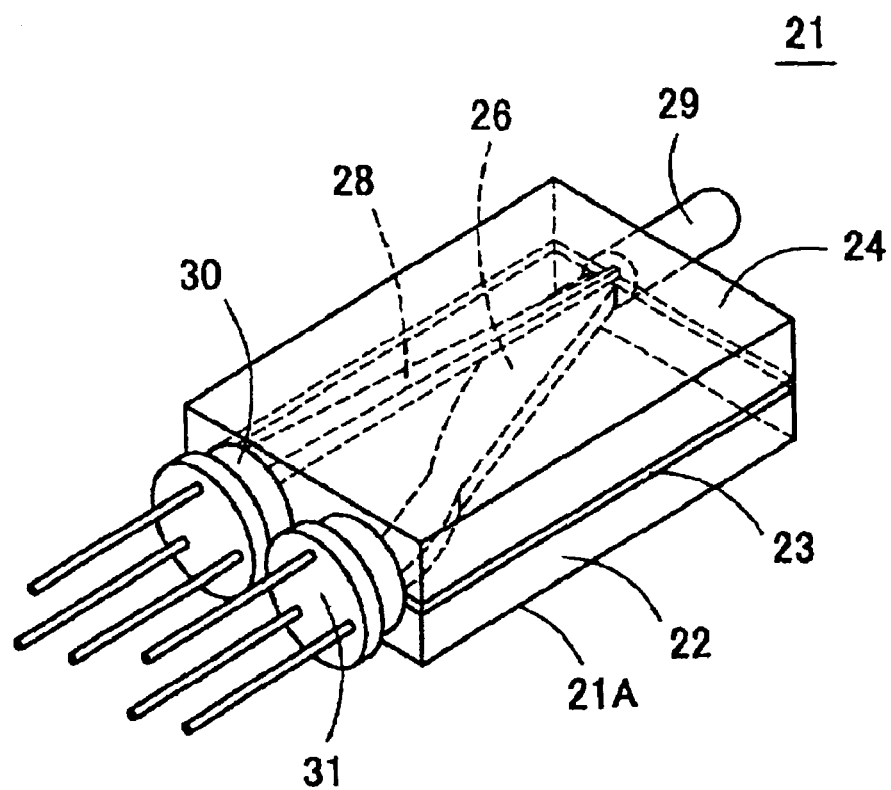
FIG. 4 is a perspective view showing how an optical transceiver according to a first embodiment of the present invention is used.
Figure 5:
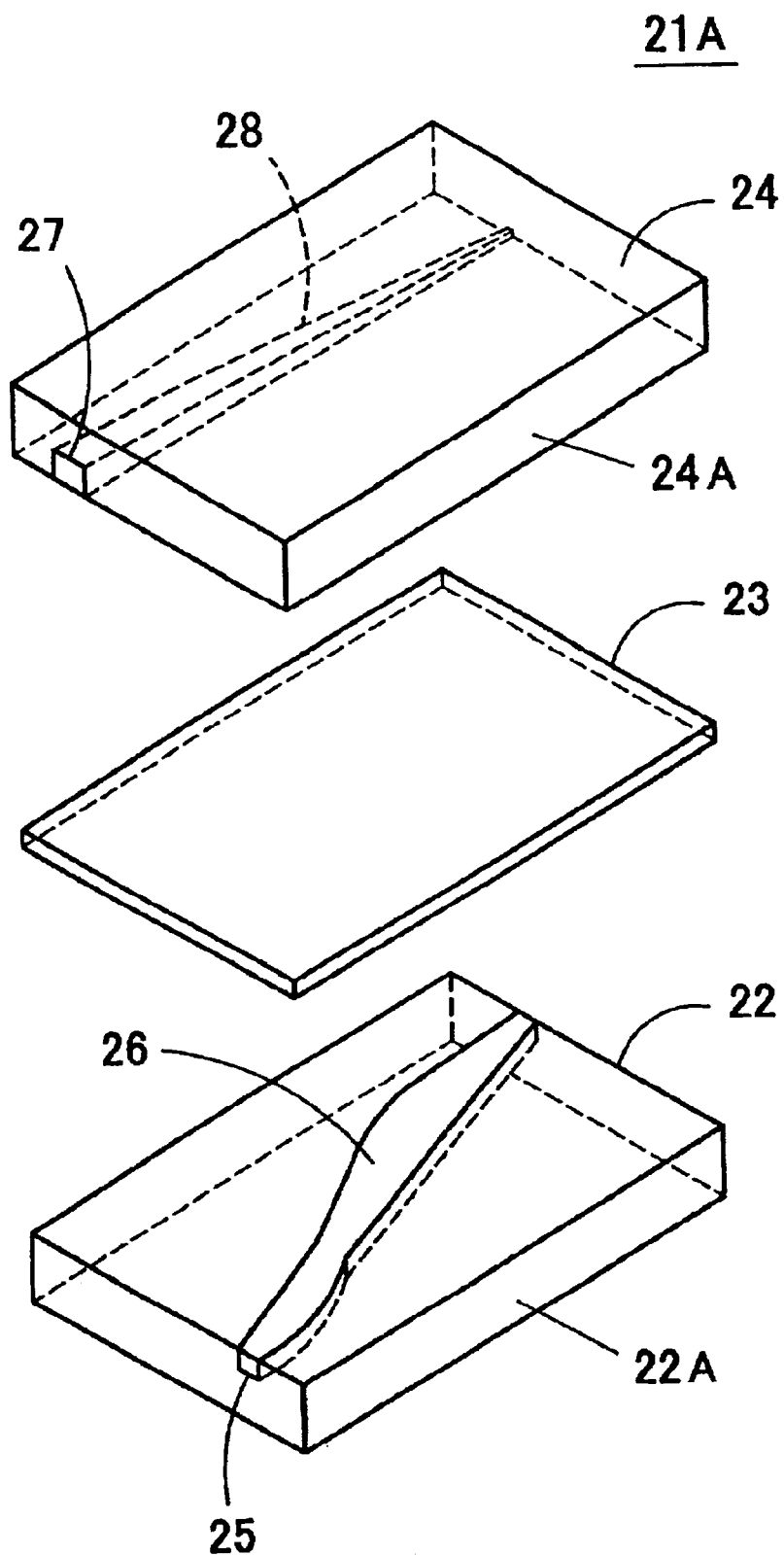
FIG. 5 is an exploded perspective view of an optical device that is used in the optical transceiver of FIG. 4.

FIG. 4 is a perspective view showing how an optical transceiver 21 according to a first embodiment of the present invention is used. FIG. 5 is an exploded perspective view of an optical device 21A that is used in the optical transceiver 21. The optical device 21A is composed of a reception-side substrate 22, a cladding layer (isolation layer) 23, and a sending-side substrate 24. The reception-side substrate 22 and the sending-side substrate 24 are integrated with each other, that is, bonded to each other, with the cladding layer 23 interposed in between.

The reception-side substrate 22 is composed of a substrate 22A made of a transparent resin (e.g., PMMA (polymethyl methacrylate); refractive index: 1.49) and a receiving light guide (core) 26. The top surface of the substrate 22A is formed with a groove 25 both side surfaces of which consist of a straight portion and a curved portion. The receiving light guide 26 is formed in the groove 25 by filling the groove 25 with a transparent resin (core material; refractive index: 1.6) having a larger refractive index than the transparent resin as the material of the substrate 22A does. Similarly, the sending-side substrate 24 is composed of a substrate 24A made of a transparent resin (e.g., PMMA; refractive index: 1.49) and a sending light guide (core) 28. The bottom surface of the substrate 24A is formed with a tapered groove 27. The sending light guide 28 is formed in the groove 27 by filling the groove 27 with a transparent resin (core material; refractive index: 1.6) having a larger refractive index than the transparent resin as the material of the substrate 24A does. The cladding layer 23 is a thin film (refractive index: 1.36) made of an ultraviolet-curing resin or the like and has a smaller refractive index than the receiving light guide 26 and the sending light guide 28 do. It is desirable that the cladding layer 23 be as thin as possible. As exemplified above by numerical values, the receiving light guide 26 and the sending light guide 28 have the largest refractive index, the reception-side substrate 22 and the sending-side substrate 24 have the intermediate refractive index, and the cladding layer 23 has the smallest refractive index.

The reception-side substrate 22, the cladding layer 23, and the sending-side substrate 24 are laid one on another and integrated together by bonding the reception-side substrate 22 and the sending-side substrate 24 with the cladding layer 23. The receiving light guide 26 and the sending light guide 28 are covered with the cladding layer 23. As shown in FIG. 4, a light input element 30 and a light-receiving element 31 are provided on one end surface of the optical device 21A, whereby the optical transceiver 21 is formed. An optical fiber 29 is coupled with the other end surface of the optical device 21A. For example, where the optical transceiver 21 is used in such an apparatus as an information appliance, the light input element 30, the light-receiving element 31, and the optical device 21A are provided inside the apparatus in advance. When connected to a connector of the apparatus, the optical fiber 29 is coupled with the optical-fiber-coupling-side end surface of the optical transceiver 21.

Figure 6:
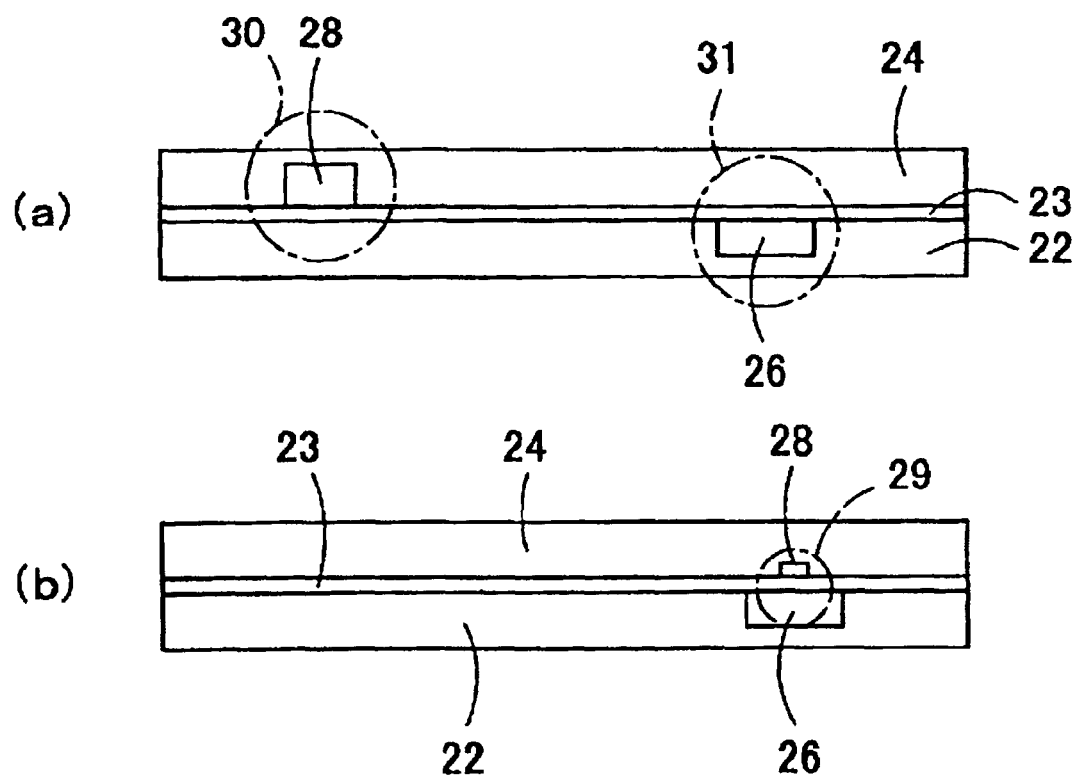
FIGS. 6A and 6B show a light-input/reception-side end surface and an optical-fiber-coupling-side end surface, respectively, of the optical transceiver of FIG. 4.

In the optical-fiber-coupling-side end surface of the optical transceiver 21, as shown in FIG. 6B, the end faces of the sending light guide 28 and the receiving light guide 26 are located adjacent to each other in the vertical direction with the cladding layer 23 interposed in between. In the optical-fiber-coupling-side end surface, the end face of the sending light guide 28 is smaller in area than that of the optical fiber 29 (core area) and the former is contained in the latter when projected to the latter. Therefore, light that is output from the sending light guide 28 is input to the optical fiber 29 with high efficiency. In the region under the cladding layer 23, the end face of the receiving light guide 26 is larger than that of the optical fiber 29 and the latter is contained in the former when projected to the former. Therefore, light that is output from the optical fiber 29 is captured by the receiving light guide 26 with high efficiency.

Since the sending light guide 28 is straight and the receiving light guide 26 is curved, the end faces of the receiving light guide 26 and the sending light guide 28 are separated from each other in the horizontal direction in the end surface (hereinafter referred to as "light-input/reception-side end surface") of the optical transceiver 21 to which the light input element 30 and the light-receiving element 31 are attached. As shown in FIG. 6A, the light input element 30 is opposed to the end face of the sending light guide 28 and the light-receiving element 31 is opposed to the end face of the receiving light guide 26. The sending light guide 28 is tapered and surrounded by the sending-side substrate 24 and the cladding layer 23 that are smaller in refractive index than the sending light guide 28. The end face of the sending light guide 28 in the light-input/reception-side end surface is larger in area than that in the optical-fiber-coupling-side end surface. Therefore, light that is output from the light input element 30 is captured by the wide area, transmitted to the optical-fiber-coupling-side end surface, output from the small area to minimize the loss, and finally input to the core of the optical fiber 29. As a result, the efficiency of light utilization of the sending light guide 28 is equal to 100%. The receiving light guide 26 is surrounded by the reception-side substrate 22 and the cladding layer 23 that are smaller in refractive index than the receiving light guide 26. The end face of the receiving light guide 26 is large in the optical-fiber-coupling-side end surface and its end face is small in the light-input/reception-side end surface. Therefore, the receiving light guide 26 efficiently captures light that is output from the optical fiber 29 and guides it to the light-receiving element 31. As a result, the efficiency of light utilization of the receiving light guide 26 is equal to 100%.

In the optical transceiver 21 having the above structure, since the reception-side substrate 22 and the sending-side substrate 24 are isolated from each other by the cladding layer 23, there occurs no interference between light traveling through the reception-side substrate 22 and light traveling through the sending-side substrate 24. In the optical-fiber-coupling-side end surface, the reception-side substrate 22 and the sending-side substrate 24 are separated from each other by the cladding layer 23. Therefore, even if part of light that is output from the sending light guide 28 is reflected by the end face of the optical fiber 29, it hardly enters the reception-side light guide 26. The crosstalk between the receiving light guide 26 and the sending light guide 28 can thus be prevented.

Figure 7:
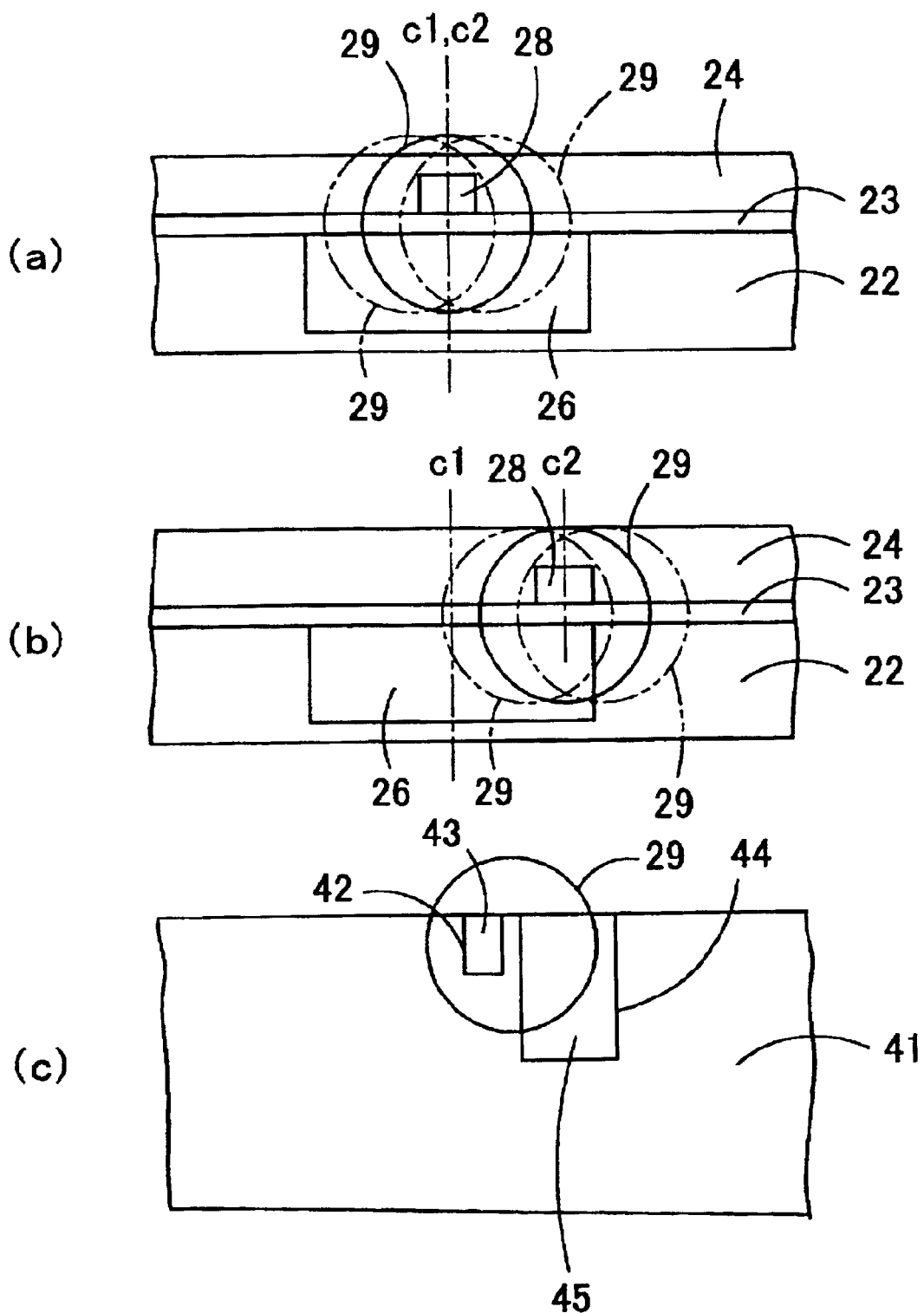
FIG. 7A shows an arrangement of a receiving light guide and a sending light guide in the optical-fiber-coupling-side end surface.
FIG. 7B is a comparative diagram showing an arrangement of the receiving light guide and the sending light guide.
FIG. 7C shows an arrangement of a receiving light guide and a sending light guide in a burying type optical transceiver.

As shown in FIG. 7A, in the optical-fiber-coupling-side end surface of the optical transceiver 21, the central axis c1 of the receiving light guide 26 coincides with the central axis c2 of the sending light guide 28. Therefore, even if the connecting position (central axis) of the optical fiber 29 deviates from the core standard position (c1, c2) indicated by a solid line in FIG. 7A to a position indicated by a one-dot chain line or a two-dot chain line in FIG. 7A, the overlap area of the optical fiber 29 and the sending light guide 28 and that of the optical fiber 29 and the receiving light guide 26 remain the same. Therefore, this structure allows a wide range of variation of the connecting position of the optical fiber 29 and hence is highly resistant to a variation of the connecting position of the optical fiber 29.

In contrast, assume that the central axis c1 of the receiving light guide 26 and the central axis c2 of the sending light guide 28 are deviated from each other as shown in FIG. 7B. In this case, if the connecting position of the optical fiber 29 deviates from the position indicated by a solid line in FIG. 7B to a position indicated by a one-dot chain line or a two-dot chain line in FIG. 7B, the overlap area of the optical fiber 29 and the sending light guide 28 and that of the optical fiber 29 and the receiving light guide 26 vary. Therefore, this structure is sensitive to a variation of the connecting position of the optical fiber 29 and hence high positional accuracy is required in connecting the optical fiber 29 to the optical transceiver. Such a situation occurs inevitably in a burying type optical transceiver as shown in FIG. 7C than in lamination type ones such as the optical transceiver 21 according to the invention. In the burying type optical transceiver shown in FIG. 7C, if a groove 42 is formed in a substrate 41 and a sending light guide 43 is buried in the groove 42 and a groove 44 is formed in the substrate 41 and a receiving light guide 45 is buried in the groove 44 so that the end face of the sending light guide 43 is smaller than that of an optical fiber 29 and the end face of the receiving light guide 45 is larger than that of the optical fiber 29, the characteristics of the optical transceiver vary when the position of the optical fiber 29 deviates in the horizontal direction because the central axes of the sending light guide 43 and the receiving light guide 45 cannot be made coincident with each other. In contrast, in the lamination structure which is employed in the invention, the central axis c1 of the receiving light guide 26 and the central axis c2 of the sending light guide 28 can be made coincident with each other and hence the optical transceiver 21 is highly resistant to a variation of the position of the optical fiber 29.

Figure 8:
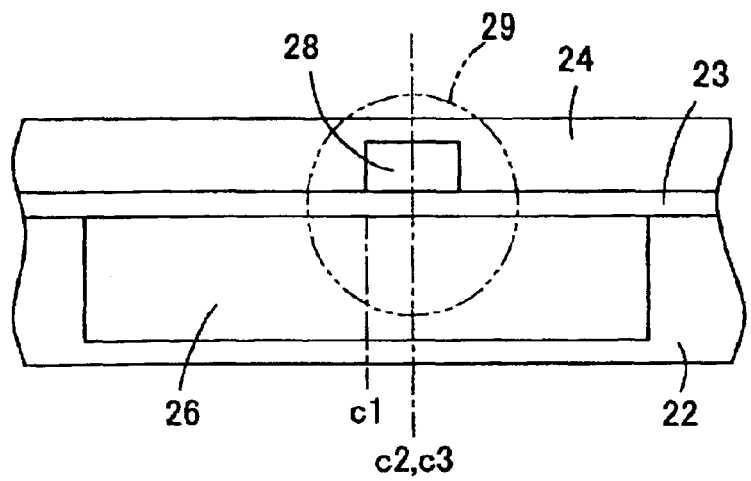
FIG. 8 shows a positional relationship among the end faces of the receiving light guide, the sending light guide, and the optical fiber in a case that is different from the case of FIG. 7A.

As described in FIG. 7A, if the central axis of the end face of the optical fiber 29 is located on the central axis c1 of the light incident face of the receiving light guide 26 and the central axis c2 of the light exit face of the sending light guide 28 that coincide with each other, the optical coupling efficiency between the optical device 21A and the optical fiber 29 hardly varies even if the position of the end face of the optical fiber 29 deviates to the right or left. However, if the conditions are too strict, the management of the manufacturing process needs to be unduly severe. On the other hand, as shown in FIG. 8, where the width of the light incident face of the receiving light guide 26 is sufficiently greater than the diameter of the optical fiber 29, there occur no problems even if the central axis c3 of the optical fiber 29 deviates from the central axis c1 of the light incident face of the receiving light guide 26 as long as the central axis c2 of the sending light guide 28 approximately coincides with the central axis c3 of the optical fiber 29. Therefore, where the width of the light incident face of the receiving light guide 26 is almost equal to the width of the end surface of the substrate as in the case of an optical device 116 shown in FIG. 30 (described later), the only requirement is that the central axis c2 of the light exit face of the sending light guide 28 coincide with the central axis c3 of the optical fiber 29; it is not necessary to pay much attention to the central axis c1 of the light incident face of the receiving light guide 26. This makes it possible to relax management conditions of manufacture. In this case, the positions of the optical fiber 29 and the sending light guide 28 are not restricted to the center of the receiving light guide 26 and hence can easily be adjusted to a position corresponding to the light input element 30.

Figure 9:
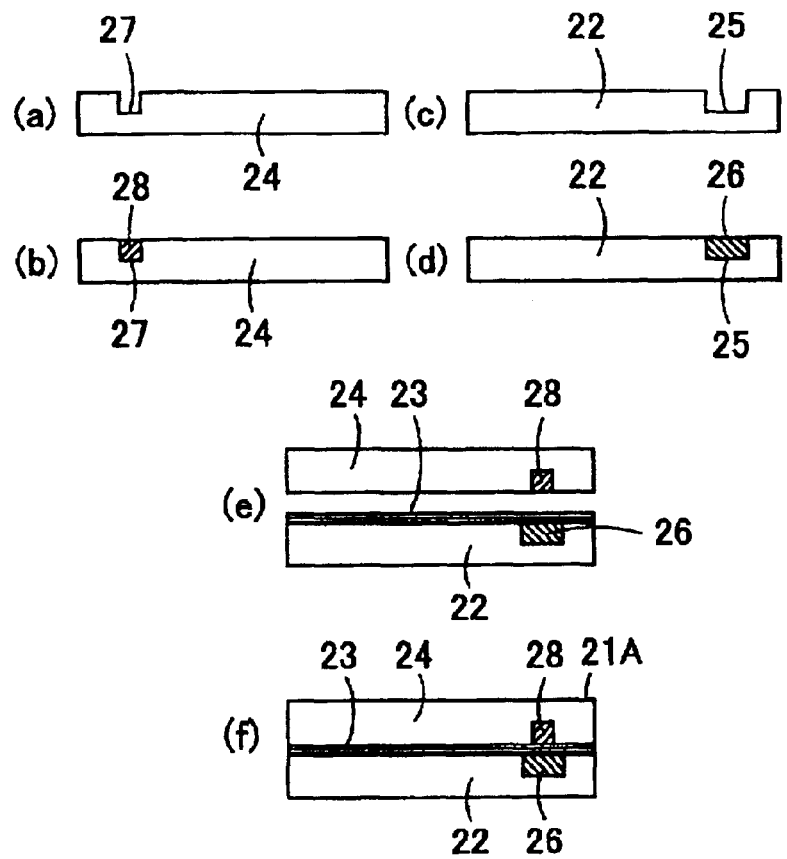
FIGS. 9A–9F are schematic diagrams illustrating a manufacturing method of the optical device in FIG. 5.

FIGS. 9A–9F are schematic diagrams illustrating a manufacturing method of the optical device 21A. First, as shown in FIG. 9A, a sending-side substrate 24 is formed by injection-molding a transparent resin (e.g., PMMA; refractive index: 1.49). At this time, one major surface of the sending-side substrate 24 is formed with a tapered groove 27. Then, as shown in FIG. 9B, the groove 27 is filled with an ultraviolet-curing resin having a large refractive index (1.6). The resin is set by illuminating it with ultraviolet light, whereby a sending light guide 28 is formed. Then, as shown in FIG. 9C, a reception-side substrate 22 is formed by injection-molding a transparent resin (e.g., PMMA; refractive index: 1.49). At this time, one major surface of the reception-side substrate 22 is formed with a groove 25. Then, as shown in FIG. 9D, the groove 25 is filled with an ultraviolet-curing resin having a large refractive index (1.6). The resin is set by illuminating it with ultraviolet light, whereby a receiving light guide 26 is formed.

Subsequently, as shown in FIG. 9E, an ultraviolet-curing resin (refractive index: 1.36) is uniformly applied to the top surface of the reception-side substrate 22 with a spin coater, whereby a cladding layer 23 is formed on the surface of the reception-side substrate 22. Then, the sending-side substrate 24 is placed on the cladding layer 23 in such a manner that its surface that is formed with the sending light guide 28 is down. The cladding layer 23 is set by illuminating it with ultraviolet light, whereby the reception-side substrate 22 and the sending-side substrate 24 are bonded to and integrated with each other with the cladding layer 23 as shown in FIG. 9F. As is understood from the above description, the lamination-type optical device 21A can simplify the manufacturing process.

Figure 10:
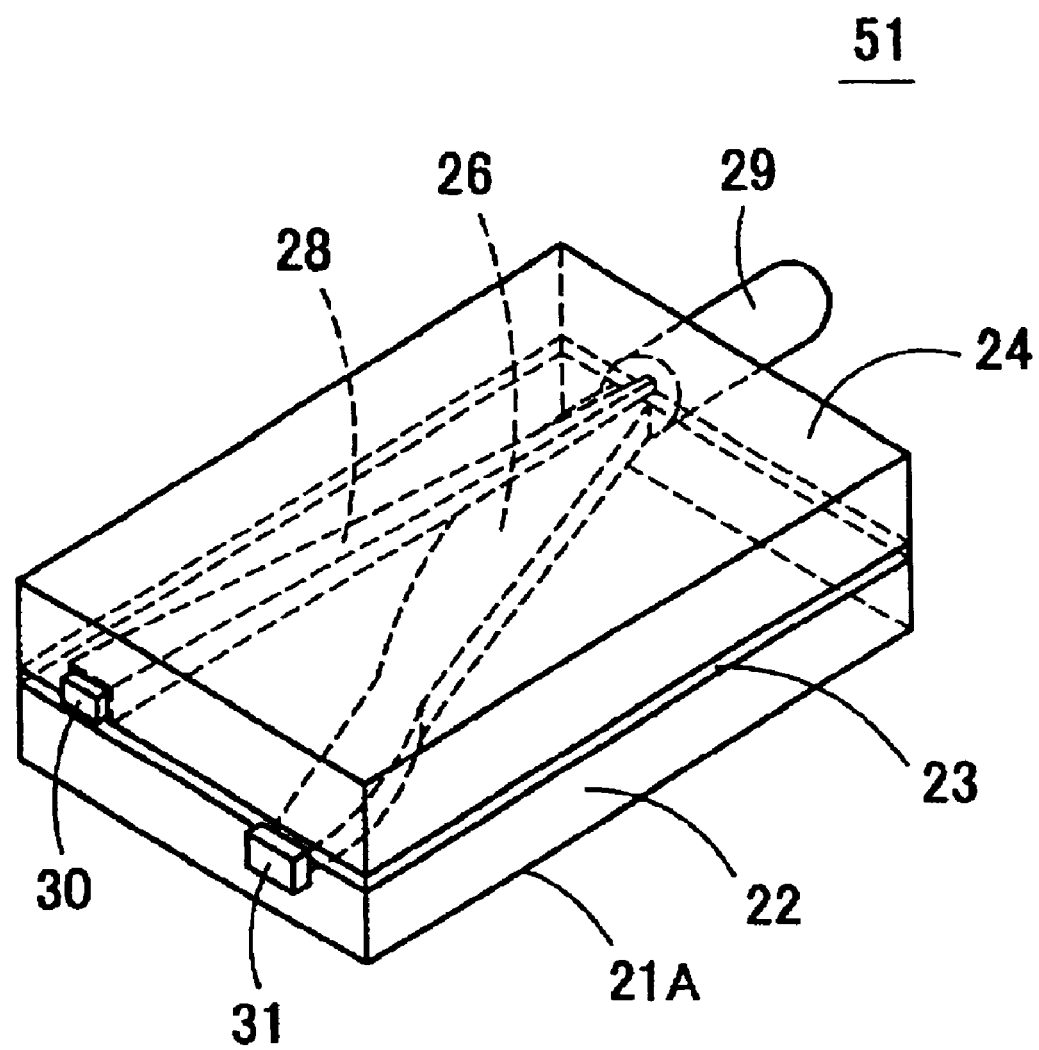
FIG. 10 is a perspective view of an optical transceiver according to a modification of the first embodiment of the invention.

Although in FIG. 4 the light input element 30 and the light-receiving element 31 are discrete parts (e.g., can-type parts), a chip-type light input element 30 and light-receiving element 31 may be bonded to and integrated with the end surface of the optical device 21A as in an optical transceiver 51 shown in FIG. 10. Although in the first embodiment crosstalk is prevented by interposing the cladding layer 23 having a small refractive index between the reception-side substrate 22 and the sending-side substrate 24, a light reflection layer such as a metal thin film or a multiple reflection film may be used as the isolation layer instead of the cladding layer 23.

Embodiment 2

Figure 11:
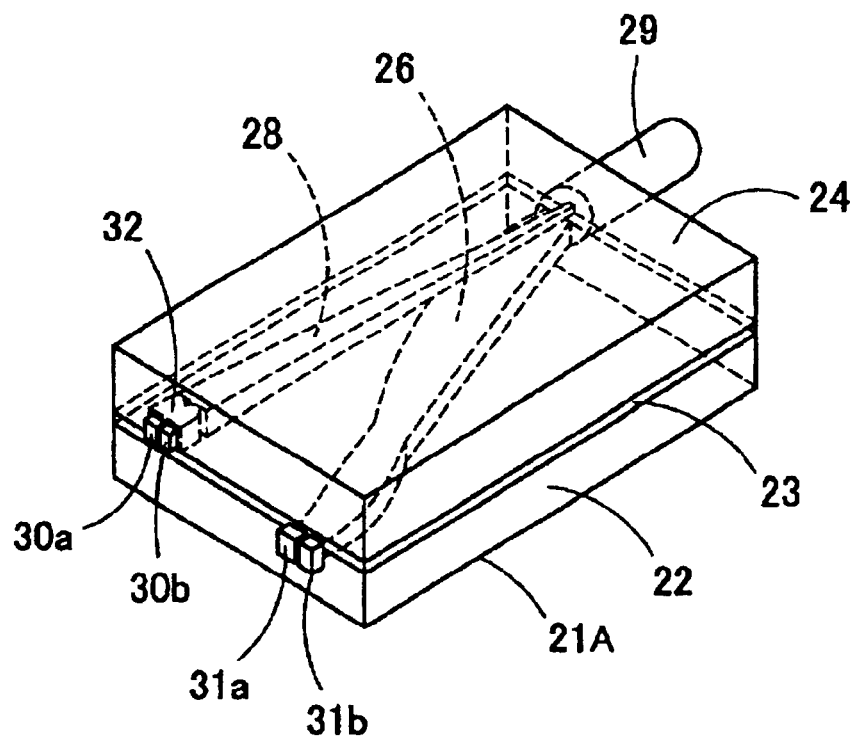
FIG. 11 is a perspective view of an optical transceiver according to a second embodiment of the invention.

FIG. 11 is a perspective view of an optical transceiver 52 according to a second embodiment of the invention. A plurality of light input elements 30a and 30b having different emission wavelengths are attached to the light-input/reception-side end surface of the optical device 21A at positions corresponding to the sending light guide 28. A lens 32 is inserted between the end face of the sending light guide 28 and the light input elements 30a and 30b. Therefore, one of the light input elements 30a and 30b emits light, an optical signal having the emission wavelength of the one light input element 30a or 30b is gathered by the lens 32 and input to the sending light guide 28 through its end face. Further, a plurality of light-receiving elements 31a and 31b having different sensitive wavelength ranges are attached to the receiving light guide 26 of the light-input/reception-side end surface of the optical device 21A. The light-receiving elements 31a and 31b receive respective optical signals in different wavelength ranges that come from the optical fiber 29.

Embodiment 3

Figure 12:
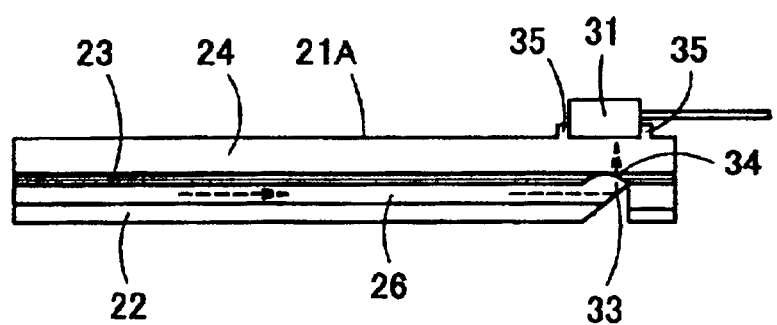
FIG. 12 is a sectional view of an optical transceiver according to a third embodiment of the invention.

FIG. 12 is a sectional view of an optical transceiver 53 according to a third embodiment of the invention. A light-receiving element 31 is attached to the top surface, rather than the end surface, of an optical device 21A. In the optical transceiver 53, the bottom surface of the reception-side substrate 22 is formed with a triangular recess at a position corresponding to the end portion of a receiving light guide 26, whereby a total reflection surface 33 having an angle of about 45° is formed. A lens portion 34 is formed at the boundary between the receiving light guide 26 and the cladding layer 23 so as to be opposed to the total reflection surface 33. The light-receiving element 31 is fixed to the top surface of the optical device 21A. Reference numeral 35 denotes projections for positioning of the light-receiving element 31.

An optical signal coming through the receiving light guide 26 is totally reflected upward by the total reflection surface 33, gathered by the lens portion 34, and finally received by the light-receiving element 31. Although in this embodiment the light-receiving element 31 is attached to the top surface of the optical device 21A, it is also possible to attach the light-receiving element 31 to the bottom surface of the optical device 21A by forming a structure similar to the above one.

Embodiment 4

Figure 13:
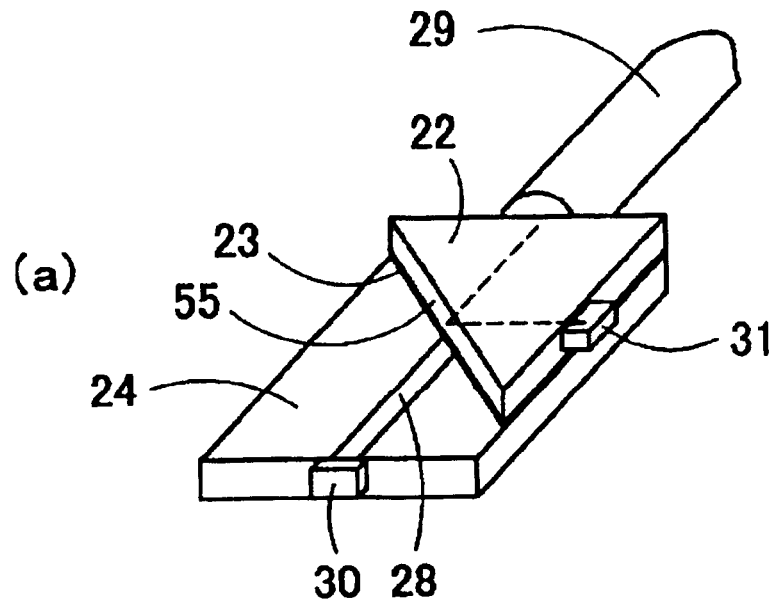
FIGS. 13A and 13B are a perspective view and a horizontal sectional view, respectively, of an optical transceiver according to a fourth embodiment of the invention.
Figure 13:
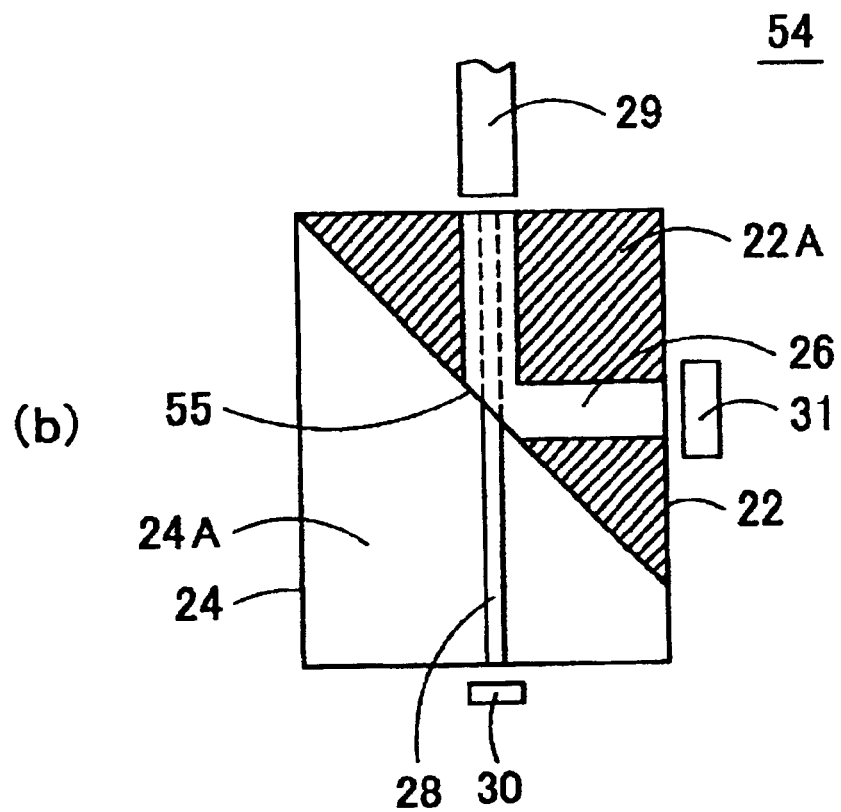

FIGS. 13A and 13B are a perspective view and a horizontal sectional view, respectively, of an optical transceiver 54 according to a fourth embodiment of the invention. The optical transceiver 54 uses an optical device in which a reception-side substrate 22 assuming a right-angled triangle is placed on a sending-side substrate 24 that is formed with a sending light guide 28 with a cladding layer 23 interposed in between. As for the reception-side substrate 22, an L-shaped receiving light guide 26 is formed inside a substrate 22A and the bending portion of the receiving light guide 26 has a total reflection surface 55 as an interface with the air (air cladding). A light input element 30 is provided at such a position as to be opposed to the light incident face of the sending light guide 28 and a light-receiving element 31 is provided at such a position as to be opposed to the light exit face of the receiving light guide 26, whereby the optical transceiver 54 is formed. The end face of an optical fiber 29 is opposed to the light exit face of the sending light guide 28 and the light incident face of the receiving light guide 26.

In the optical transceiver 54, light coming from the optical fiber 29 travels through the receiving light guide 26, is totally reflected by the total reflection surface 55, then travels through the receiving light guide 26 in the horizontal direction, and is finally received by the light-receiving element 31.

In the optical transceiver 21 having the structure of FIG. 4, the optical device 21A should be long enough to separate the light input element 30 and the light-receiving element 31 on the light-input/reception-side end surface. Therefore, it is difficult to miniaturize the optical transceiver 21. In contrast, in the optical transceiver 54 having the above structure, the light input element 30 and the light-receiving element 31 can easily be separated from each other by bending the receiving light guide 26 by about 90° so as to form the total reflection surface 55 as an interface with the air cladding. Therefore, the optical transceiver 54 can be miniaturized easily.

A refractive index difference of an interface between resins cannot change the traveling direction of light by such a large angle. In contrast, an interface between air (air cladding) and a resin as used in this embodiment can provide a large refractive index difference and hence can change the traveling direction of light by a large angle. Further, in the lamination-type optical transceiver 54, another substrate is placed on only part of the sending-side substrate 24. Therefore, it is not necessary to etch another substrate etc. to obtain air cladding; the only measure to be taken is to change the shape of the substrate 22A. Capable of utilizing air cladding easily, the lamination-type optical transceiver 54 can be miniaturized by virtue of its very simple structure.

Embodiment 5

Figure 14:
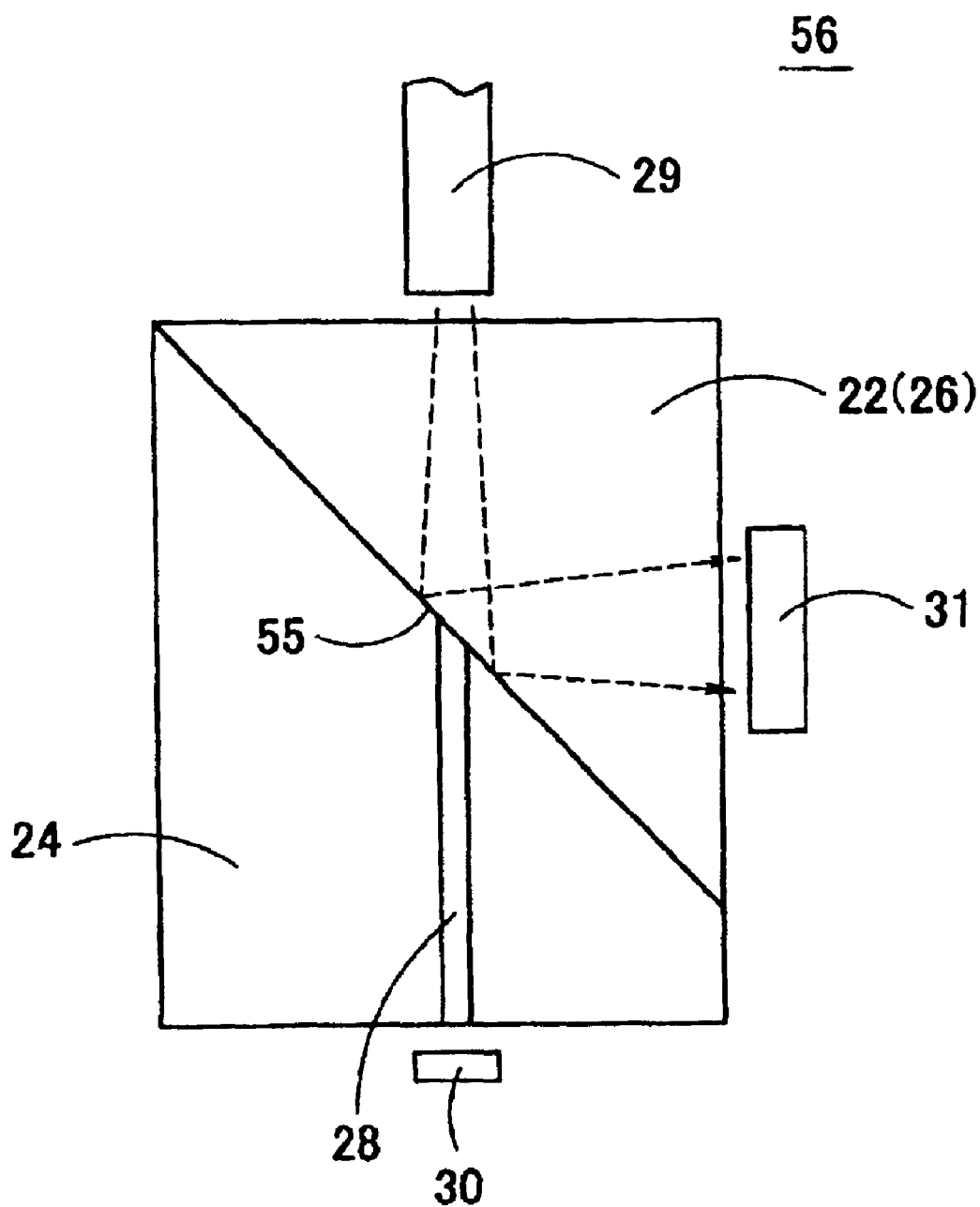
FIG. 14 is a plan view of an optical transceiver according to a fifth embodiment of the invention.

FIG. 14 is a plan view of an optical transceiver 56 according to a fifth embodiment of the invention. The optical transceiver 56 employs an optical device in which a triangular-prism-shaped reception-side substrate 22 is placed on a sending-side substrate 24 with a cladding layer 23 interposed in between and the entire reception-side substrate 22 is made a receiving light guide (core) 26 (that is, there is no substrate 22A). The inclined surface of the reception-side substrate 22 is a total reflection surface 55 that is in contact with air cladding.

Embodiment 6

Figure 15:
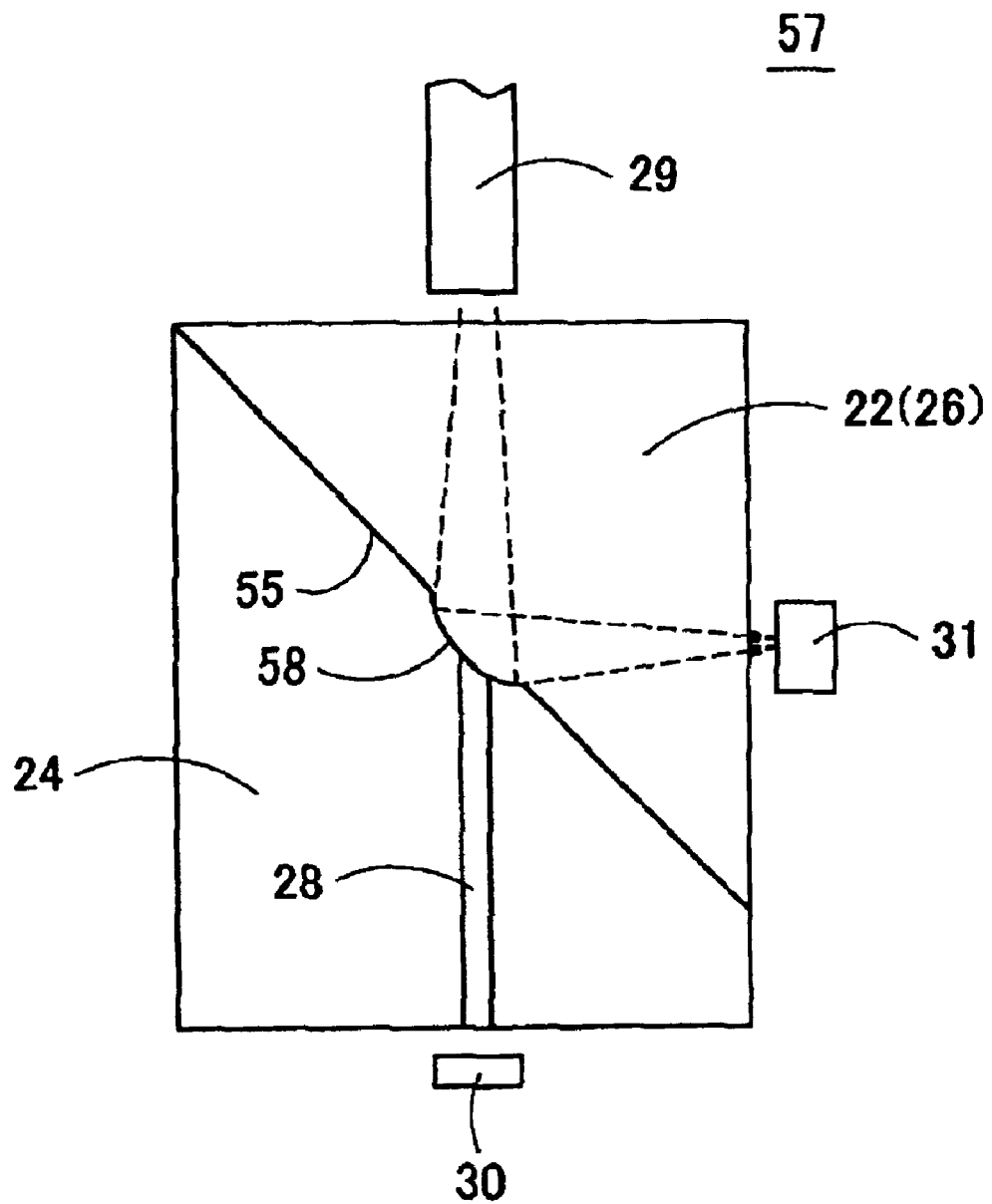
FIG. 15 is a plan view of an optical transceiver according to a sixth embodiment of the invention.

FIG. 15 is a plan view of an optical transceiver 57 according to a sixth embodiment of the invention. The optical transceiver 57 employs an optical device in which a triangular-prism-shaped reception-side substrate 22 is placed on a sending-side substrate 24 with a cladding layer 23 interposed in between and the entire reception-side substrate 22 is made a receiving light guide 26. Further, the inclined surface of the reception-side substrate 22 is a total reflection surface 55 that is in contact with air cladding, and part of the total reflection surface 55 is made a light-gathering portion 58 that is curved like a concave mirror. Light coming from an optical fiber 29 is reflected by the light-gathering portion 58 which is part of the total reflection surface 55, whereby the light traveling direction is changed by about 90° and the light is input to a light-receiving element 31 while being gathered.

Embodiment 7

Figure 16:
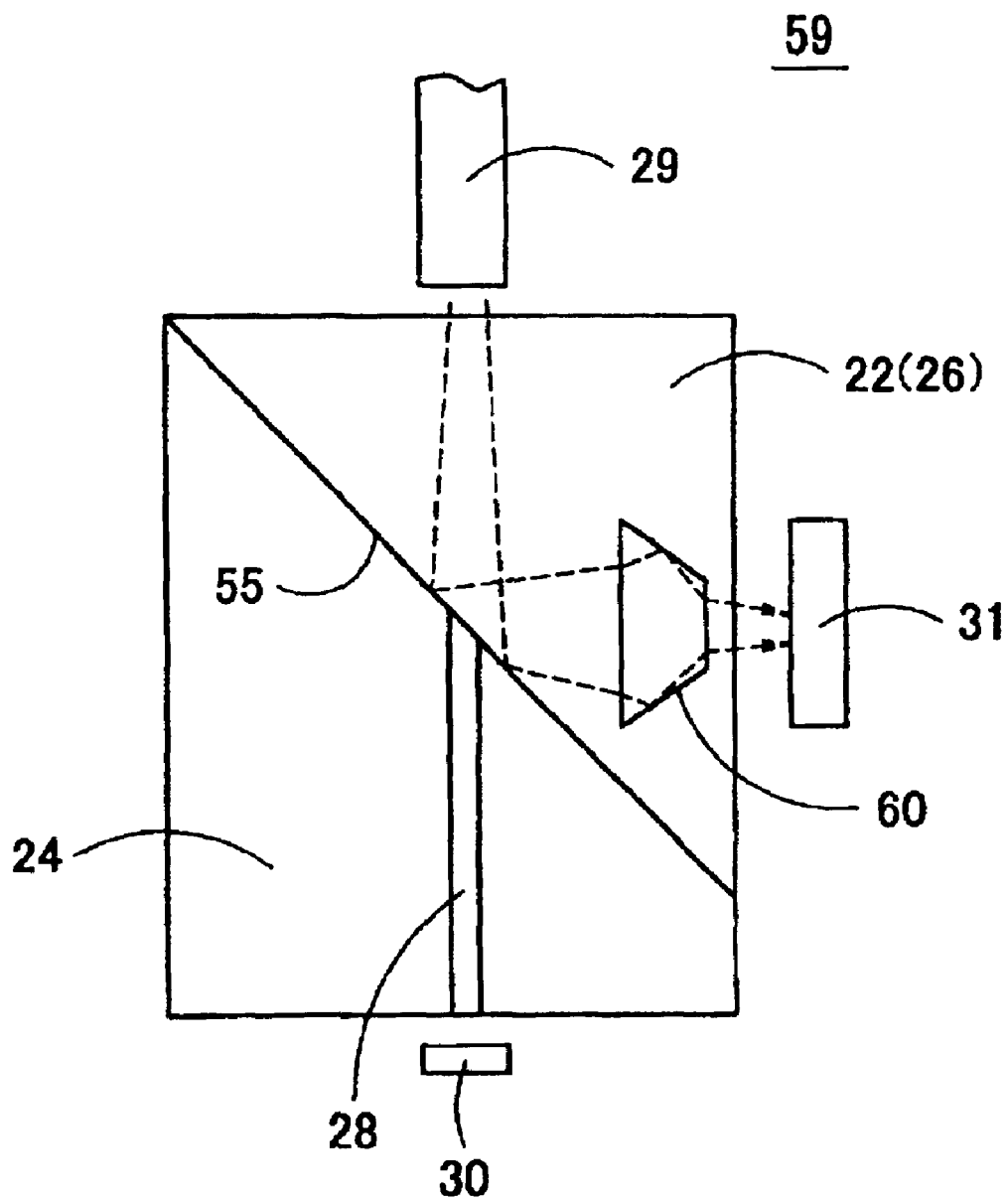
FIG. 16 is a plan view of an optical transceiver according to a seventh embodiment of the invention.

FIG. 16 is a plan view showing an optical transceiver 59 according to a seventh embodiment of the invention. The optical transceiver 59 employs an optical device in which a reception-side substrate 22 that is a triangular prism is placed on a sending-side substrate 24 with a cladding layer 23 interposed in between and the entire reception-side substrate 22 is made a receiving light guide 26. The inclined surface of the reception-side substrate 22 is a total reflection surface 55 that is in contact with air cladding. Further, a cavity is formed in the reception-side substrate 22 at such a position as to be opposed to a light-receiving element 31, whereby a waveguide lens 60 is formed there. After light coming from an optical fiber 29 is reflected by the total reflection surface 55 and the light traveling direction is thereby changed by about 90°, the light is gathered by the waveguide lens 60 and input to the light-receiving element 31.

Embodiment 8

Figure 17:
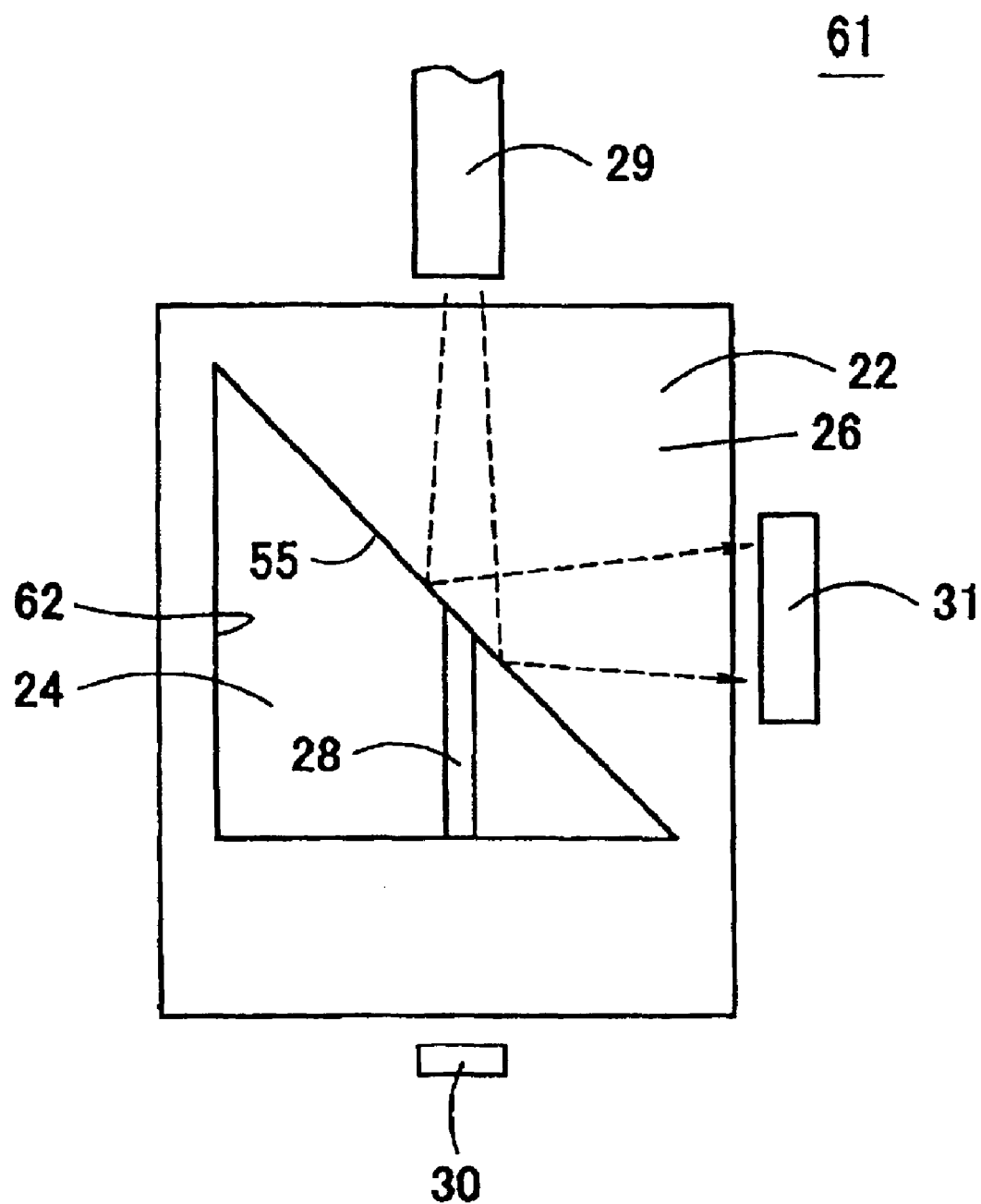
FIG. 17 is a plan view of an optical transceiver according to an eighth embodiment of the invention.

FIG. 17 is a plan view of an optical transceiver 61 according to an eighth embodiment of the invention. The optical transceiver 61 employs an optical device in which a cavity 62 assuming a right-angled triangle is formed in a reception-side substrate 22, whereby an air cladding is formed. Light is bent by about 90° by a total reflection surface 55 that is in contact with the cavity (air cladding) 62 and the reflected light is input to a light-receiving element 31.

Embodiment 9

Figure 18:
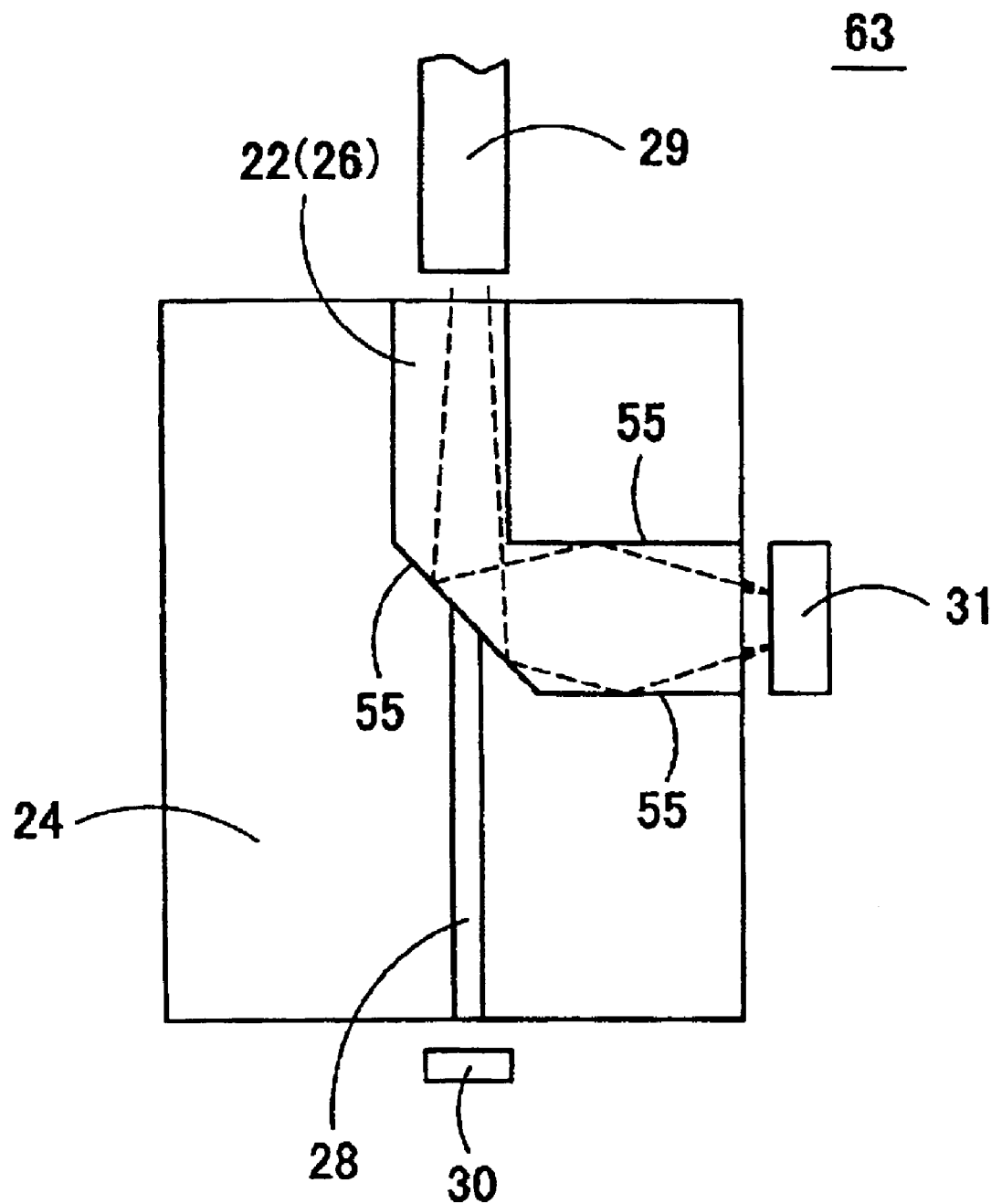
FIG. 18 is a plan view of an optical transceiver according to a ninth embodiment of the invention.

FIG. 18 is a plan view of an optical transceiver 63 according to an ninth embodiment of the invention. The optical transceiver 63 employs an optical device in which an L-shaped reception-side substrate 22 is placed on a sending-side substrate 24 with a cladding layer 23 interposed in between and the entire reception-side substrate 22 is made a receiving light guide 26. Both side surfaces of the reception-side substrate 22 are total reflection surfaces 55 that are in contact with air cladding. Light that is input from an optical fiber 29 to the reception-side substrate 22 travels through the reception-side substrate 22 while being totally reflected by both side surface of the reception-side substrate 22 repeatedly. The light traveling direction is bent by the inclined surface of the reception-side substrate 22 by 90° and the reflected light is input to a light-receiving element 31.

Embodiment 10

Figure 19:
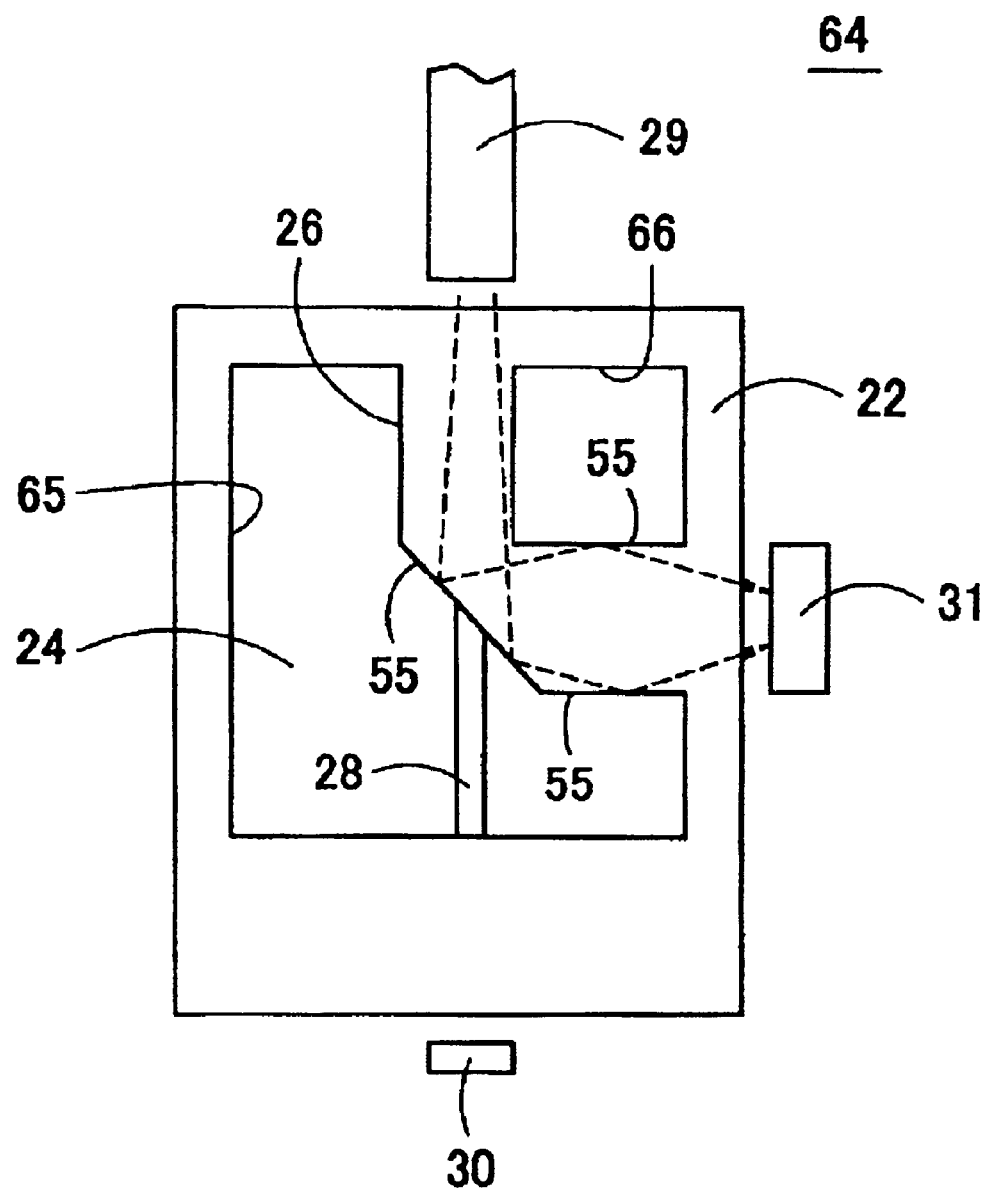
FIG. 19 is a plan view of an optical transceiver according to a 10th embodiment of the invention.

FIG. 19 is a plan view of an optical transceiver 64 according to a 10th embodiment of the invention. The optical transceiver 64 employs an optical device in which cavities 65 and 66 are formed in a reception-side substrate 22, whereby a receiving light guide 26 is formed that is similar in shape to the reception-side substrate 22 of the ninth embodiment shown in FIG. 18.

Embodiment 11

Figure 20:
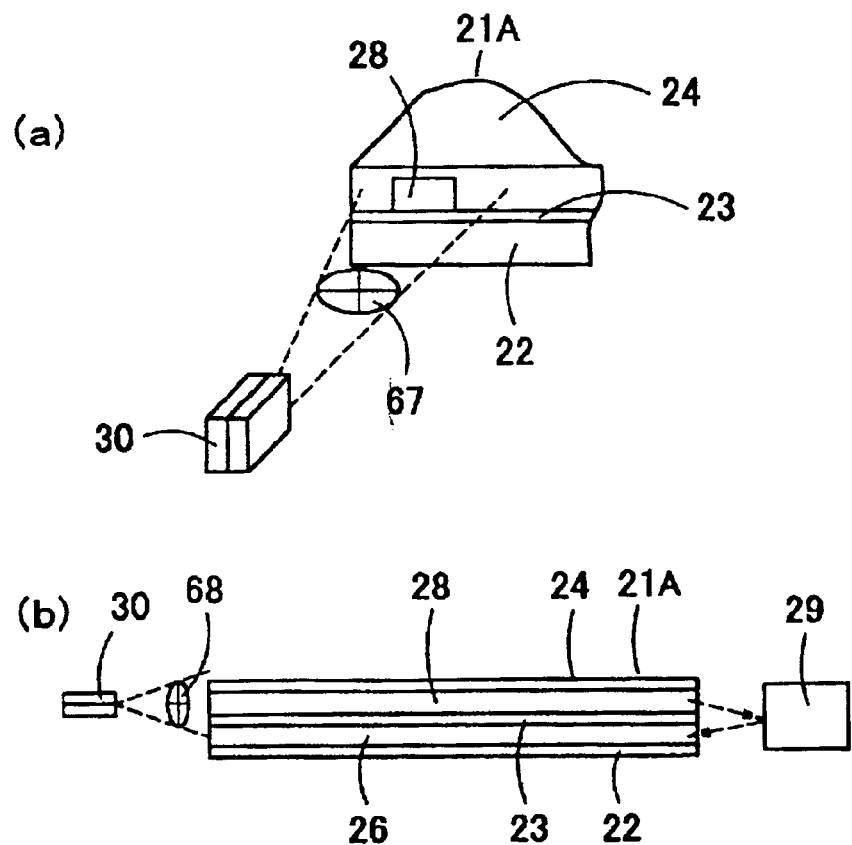
FIG. 20A shows a relationship between the shape of a light beam emitted from a light input element and the lamination direction of an optical device.
FIG. 20B is an explanatory view shows another relationship for comparison.

FIG. 20B schematically shows how a laser diode (LD) chip is used as the light input element 30. Where a laser diode is used, because of its mounting form, usually it is surface-mounted in such a manner that the pn junction surface is oriented parallel with the circuit board. However, if the pn junction surface is oriented horizontally, laser light that is emitted from the laser diode has an elliptical cross-section that is long in the vertical direction. If light having such a cross-section (long in the vertical direction) is input to the sending light guide 28 of the optical device 21A that is oriented horizontally as shown in FIG. 20B, light that is output from the optical-fiber-coupling-side end surface also comes to have a cross-section that is long in the vertical direction. Therefore, when part of the light is reflected by the end face of the optical fiber 29, the reflected light is prone to enter the receiving light guide 26 to cause crosstalk.

In view of the above, where the light input element 30 is of such a type as to emit light whose cross-section is long in one direction like a laser diode does, it is desirable that, as shown in FIG. 20A, the light input element 30 be so oriented that light that is emitted from it has a cross-section whose minor axis is parallel with the lamination direction of the optical device 21A. For example, where a laser diode is used as the light input device 30, it is desirable that the laser diode be rotated with respect to the optical device 21A so that its pn junction surface becomes perpendicular to the cladding layer 23 of the optical device 21A.

Figure 21:
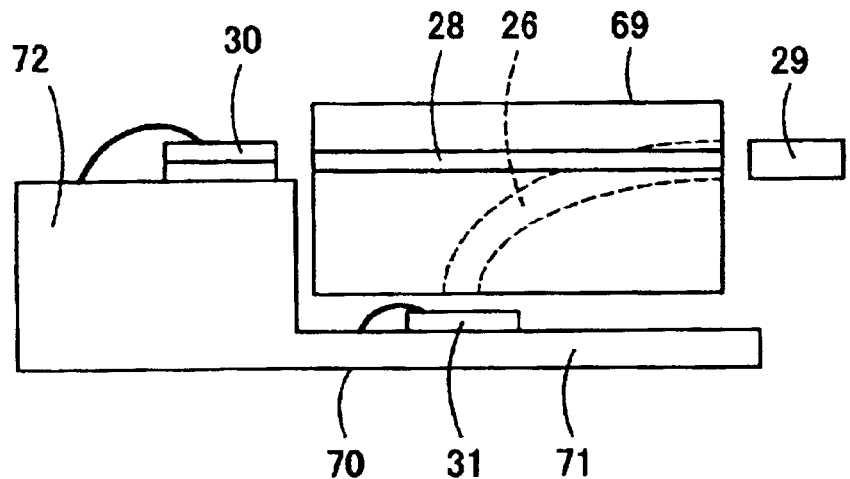
FIG. 21 shows an optical transceiver according to an 11th embodiment of the invention that is suitable for realizing the arrangement of FIG. 20A.

However, if the light input element 30 is oriented vertically as shown in FIG. 20A, it is difficult to mount the light input element 30. On the other hand, if the optical device 21A shown in FIG. 4 is oriented vertically and the light input element 30 is oriented horizontally, it is difficult to mount the light-receiving element 31. In view of these problems, in an optical transceiver according to an 11th embodiment shown in FIG. 21, a circuit board 70 is prepared that has a thin board portion 71 and a thick board portion 72. A light-receiving element 31 is surface-mounted on the thin board portion 71, and the light input element 30 is mounted on the thick board portion 72 in such a manner that the pn junction surface is oriented horizontally. An optical transceiver 69 is prepared in which the end faces of a receiving light guide 26 and a sending light guide 28 are located in surfaces that are perpendicular to each other (e.g., the optical transceiver 54 of FIG. 13). The optical transceiver 69 is oriented vertically and the end faces of the receiving light guide 26 and the sending light guide 28 are opposed to the light-receiving element 31 and the light input element 30, respectively. With this arrangement, whereas the minor axis direction of light that is output from the light input element 30 can be made parallel with the lamination direction of the optical transceiver 69, the light input element 30 and the light-receiving element 31 can be mounted in place properly.

Embodiment 12

Figure 22:
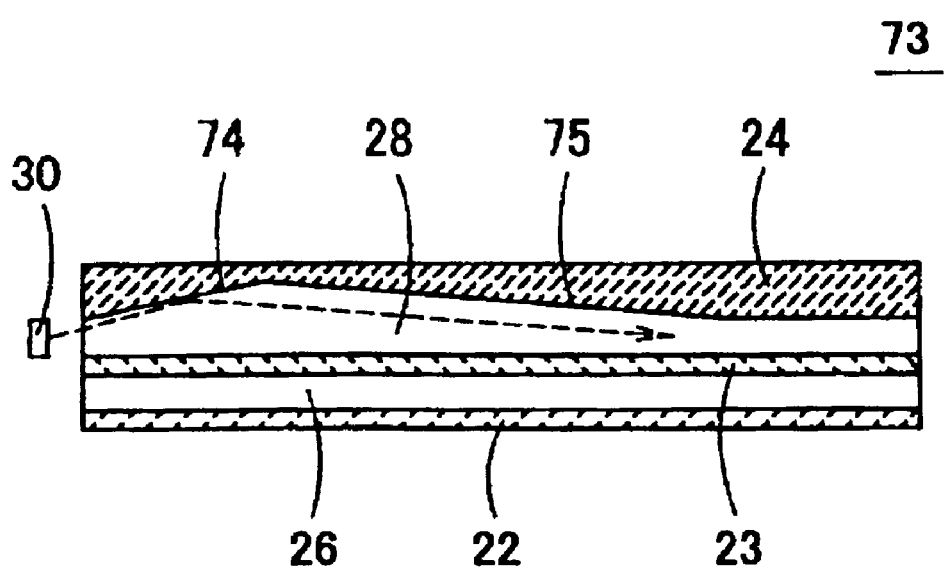
FIG. 22 schematically shows an optical transceiver according to a 12th embodiment of the invention.

FIG. 22 schematically shows an optical transceiver 73 according to a 12th embodiment of the invention. This embodiment is also intended to reduce crosstalk. In the optical transceiver 73, the end portion of a sending light guide 28 on the side of a light input element 30 has an inclined surface 74 that is so inclined that the sending light guide 28 becomes wider toward the optical-fiber-coupling-side end surface. The portion of the sending light guide 28 behind the inclined surface 74 has an inclined surface 75 that is inclined gently so that the sending light guide 28 becomes narrower toward the optical-fiber-coupling-side end surface. With the inclined surface 74, as shown in FIG. 22, light that is reflected by the inclined surface 74 travels approximately parallel with the cladding layer 23 to decrease an NA (numerical aperture) value. Therefore, light that has been output from the sending light guide 28 and reflected by the end face of an optical fiber 29 hardly enters a receiving light guide 26, whereby crosstalk can be reduced. Although in the optical transceiver 73 of FIG. 22 only the top surface of the sending light guide 28 is formed with the inclined surface 74, its bottom surface and/or both its side surfaces may also be formed with such an inclined surface.

Figure 23:
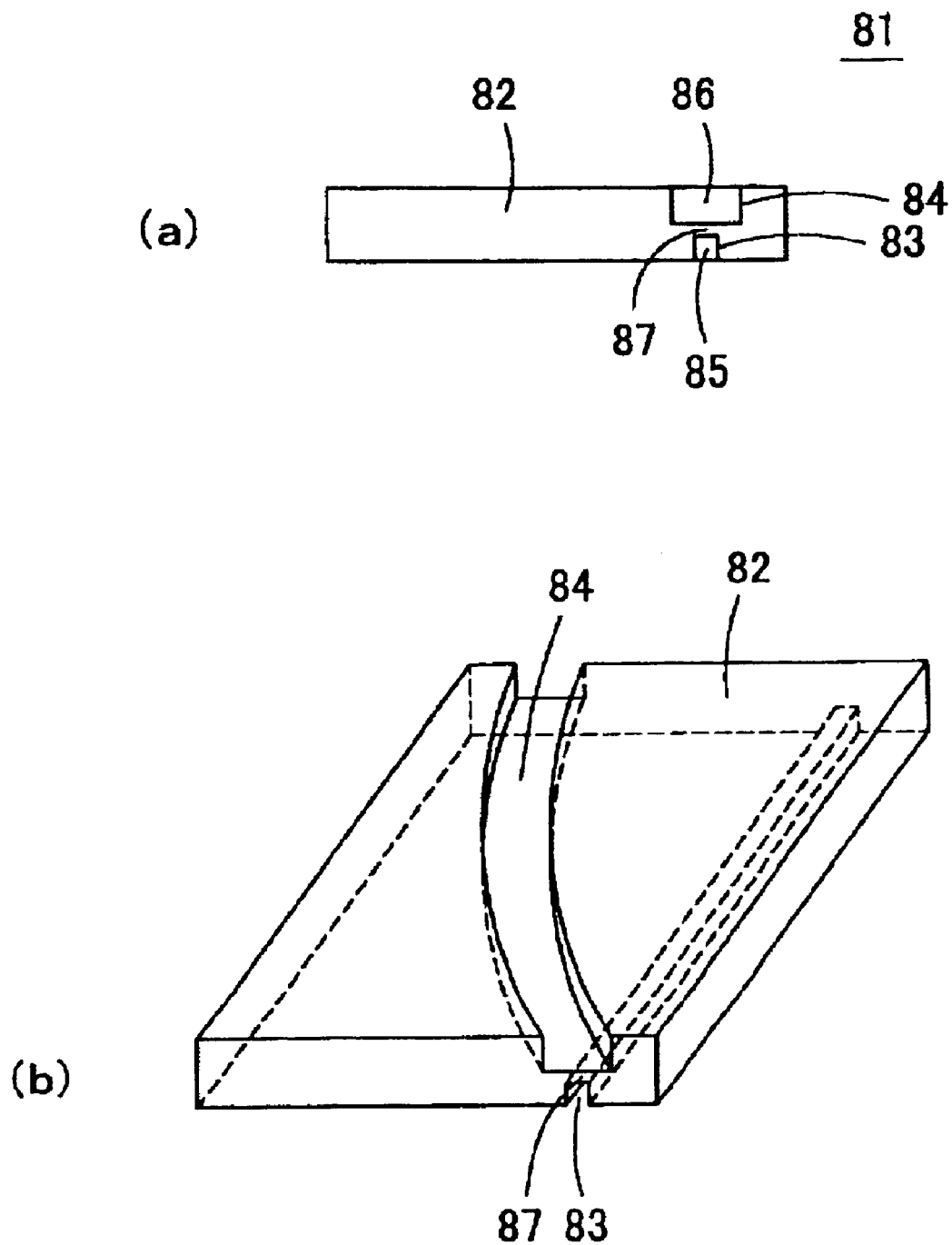
FIG. 23A shows an end surface view of an optical device according to a 13th embodiment of the invention.
FIG. 23B is a perspective view of a substrate that is used in the optical device of FIG. 23A.

FIG. 23A shows an end face of an optical device 81 according to a 13th embodiment of the invention. FIG. 23B is a perspective view of a substrate 82 that is used in the optical device 81. In this embodiment, as shown in FIG. 23B, the bottom surface of the substrate 82 is formed with a straight groove 83 and the top surface of the substrate 82 is formed with a curved groove 84. The groove 83 is filled with a core material such as an ultraviolet-curing resin to form a sending light guide 85, and the groove 84 is filled with a core material such as an ultraviolet-curing resin to form a receiving light guide 86.

When used in an optical transceiver, also the optical device 81 can prevent crosstalk because the sending light guide 85 and the receiving light guide 86 are isolated from each other by a thin portion 87 of the substrate 82. Further, the optical device 81 can be manufactured easily because it can be manufactured by merely forming the receiving light guide 86 and the sending light guide 85 on the front side and the back side of the substrate 82, respectively.

Embodiment 14

Figure 24:
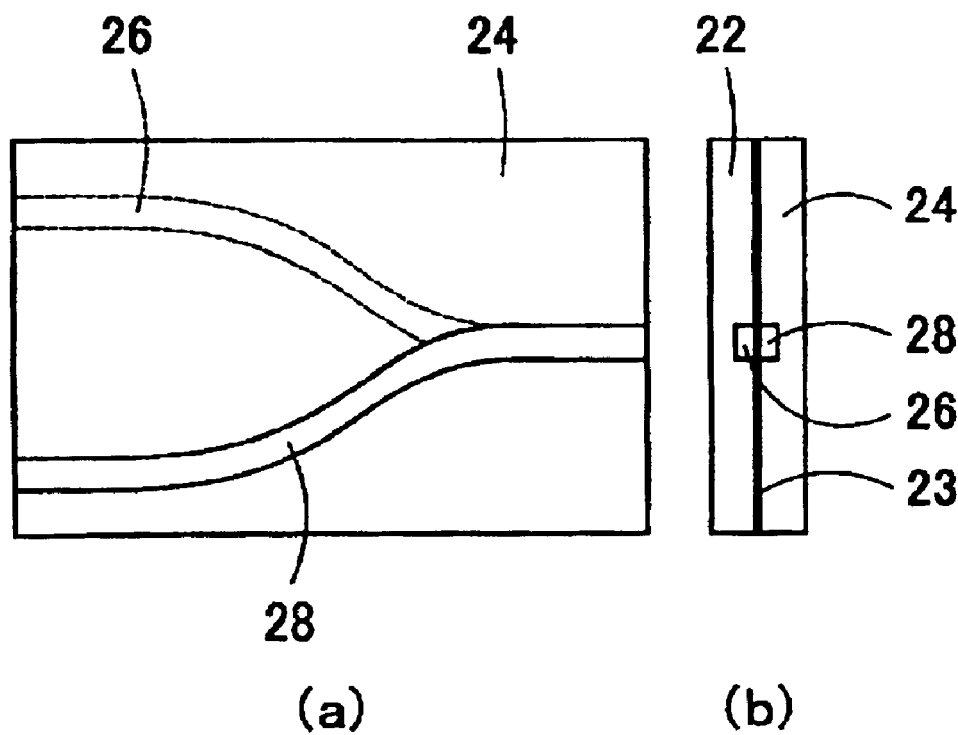
FIGS. 24A and 24B are a plan view and an end surface view, respectively, of an optical device according to a 14th embodiment of the invention.

FIGS. 24A and 24B are a plan view and an end surface view, respectively, of an optical device 91 according to a 14th embodiment of the invention. The optical device 91 can prevent crosstalk because a receiving light guide 26 and a sending light guide 28 are separated from each other in the lamination direction in the optical-fiber-coupling-side end surface. Further, since each of the receiving light guide 26 and the sending light guide 28 is curved smoothly in the horizontal plane, the distance between the end of the receiving light guide 26 and the end of the sending light guide 28 can be increased without lowering the efficiency.

Figure 1:
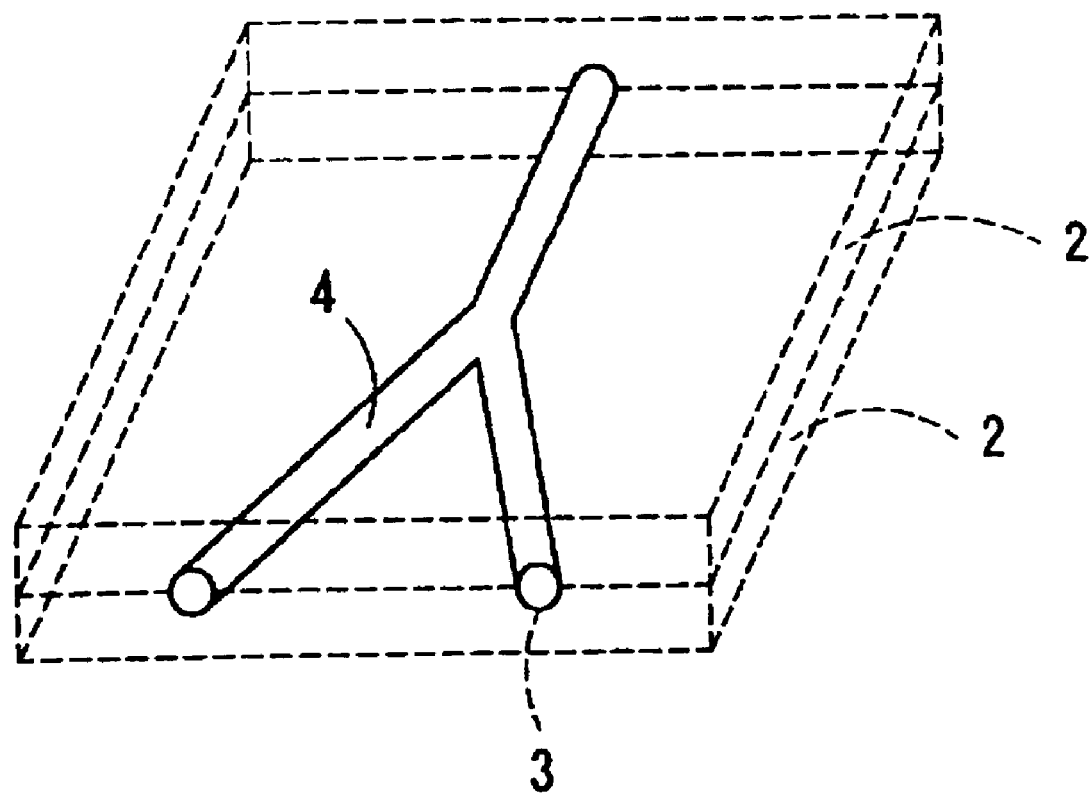
FIG. 1 is a perspective view showing the structure of an optical device used in a conventional optical transceiver.
Figure 2:
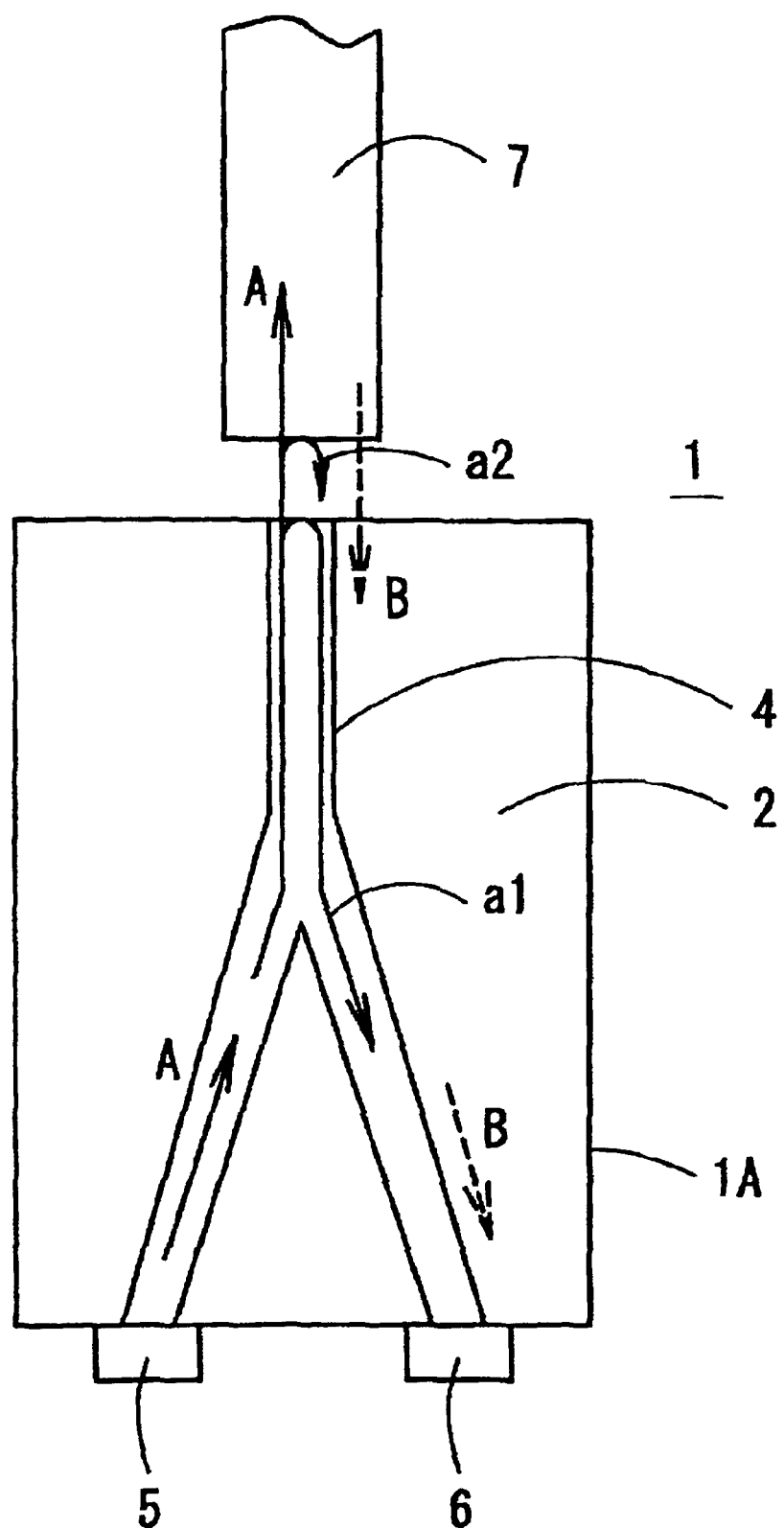
FIG. 2 is an explanatory view showing how the optical device of FIG. 1 operates.
Figure 3:
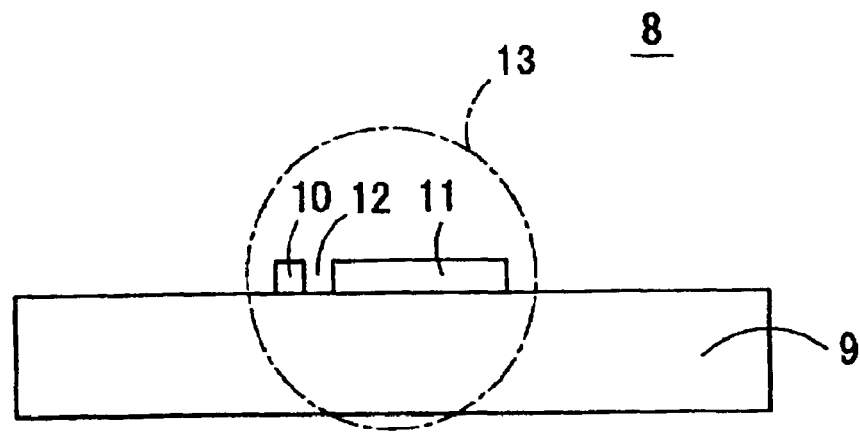
FIG. 3 is a schematic diagram showing the structure of another conventional optical transceiver.

The structure shown in FIG. 1 causes crosstalk because the light guide is branched so as to assume a Y shape. In contrast, an optical transceiver using the optical device 91 of FIGS. 24A and 24B prevents crosstalk because the receiving light guide 26 and the sending light guide 28 are isolated from each other. In the structure shown in FIG. 1, the angle of the bending portion cannot be made large. Therefore, the optical transceiver becomes unduly large if the distance between the light input element and the light-receiving element is increased. On the other hand, the efficiency lowers if the angle of the bending portion is made large. In contrast, in an optical transceiver using the optical device 91, since the receiving light guide 26 and the sending light guide 28 are curved gradually, the distance between the receiving light guide 26 and the end of the sending light guide 28 can be increased without lowering the efficiency.

Embodiment 15

Figure 25:
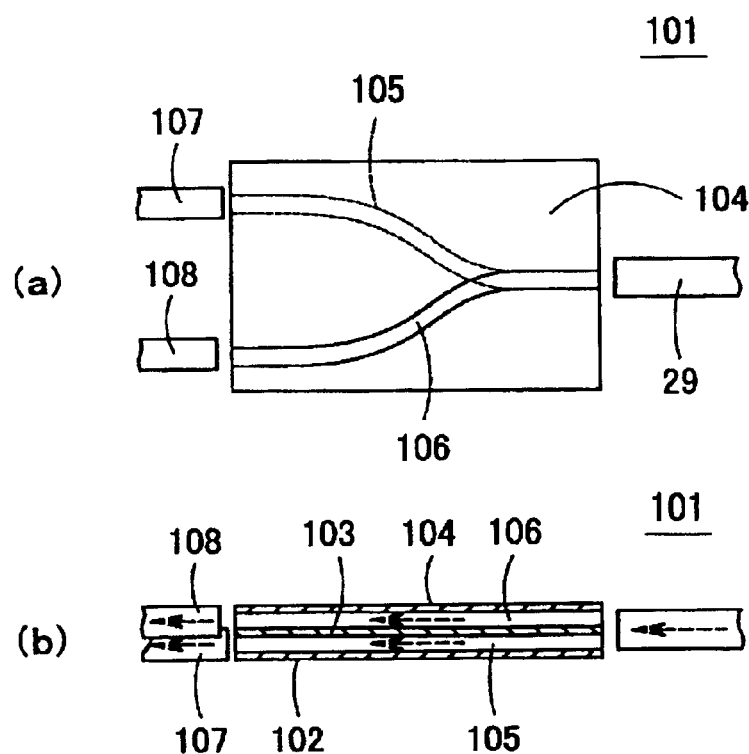
FIGS. 25A and 25B are a plan view and a sectional schematic view showing a twin core/single core converter according to a 15th embodiment of the invention.

FIGS. 25A and 25B show a twin core/single core converter 101 according to a 15th embodiment of the invention. In the twin core/single core converter 101, a substrate 102, a cladding layer 103, and a substrate 104 are laid one on another and integrated together. The top surface of the substrate 102 is formed with a light guide 105 and the bottom surface of the substrate 104 is formed with a light guide 106. The light guides 105 and 106 have the same optical characteristics. In the end surface with which an optical fiber 29 is coupled, the end faces of the light guides 105 and 106 are located adjacent to each other with the cladding layer 103 interposed in between. Also on the end surface on the side opposite to the optical fiber 29, optical fibers 107 and 108 are coupled with the end faces of the light guides 105 and 106, respectively. An optical signal that is output from the optical fiber 29 enters the light guides 105 and 106, travels through the light guides 105 and 106, and enters the optical fibers 107 and 108. Therefore, in the twin core/single core converter 101 having the above structure, two identical optical signals corresponding to an optical signal that is output from the optical fiber 29 can be transmitted to the respective optical fibers 107 and 108.

Embodiment 16

Figure 26:
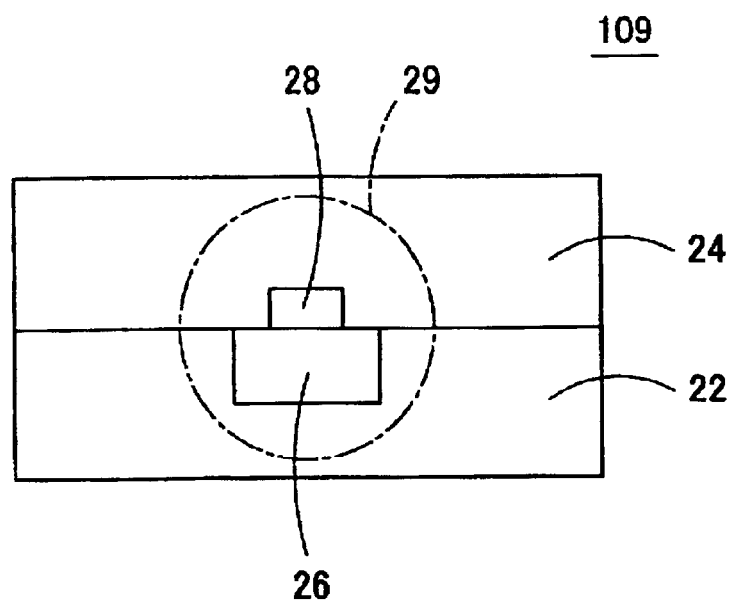
FIG. 26 shows an end surface view of an optical device according to a 16th embodiment of the invention.

FIG. 26 shows an end surface of an optical device 109 according to a 16th embodiment of the invention. In the optical device 109, a reception-side substrate 22 that is formed with a receiving light guide 26 and a sending-side substrate 24 that is formed with a sending light guide 28 are bonded to each other without intervention of a cladding layer (adhesive). The top surface of the receiving light guide 26 and the bottom surface of the sending light guide 28 are in direct contact with each other in the vicinity of the optical-fiber-coupling-side end surface. However, the refractive index of the sending light guide 28 is greater than that of the receiving light guide 26. And the refractive index of the reception-side substrate 22 and the sending-side substrate 24 is smaller than that of the receiving light guide 26.

Since the receiving light guide 26 and the sending light guide 28 are in contact with each other on the end face of the optical fiber 29, there is fear that a reception signal may leak from the receiving light guide 26 to the sending light guide 28. On the other hand, since the sending light guide 28 has a greater refractive index, leakage of a transmission signal from the sending light guide 28 to the receiving light guide 26 can be prevented. Therefore, crosstalk as caused by leakage of a transmission signal from the sending light guide 28 to the receiving light guide 26 can be prevented. Even if a reception signal leaks from the receiving light guide 26 to the sending light guide 28, the problem of crosstalk does not occur though the reception signal attenuates and hence the efficiency lowers. That is, although the receiving light guide 26 and the transmission light guide 28 are in direct contact with each other, crosstalk can be prevented when the optical device 109 is used in an optical transceiver.

Even where the end portions of the receiving light guide 26 and the sending light guide 28 are in direct contact with each other as in the case of this embodiment, a substrate 22A or 24A may be omitted.

Embodiment 17

Figure 27:
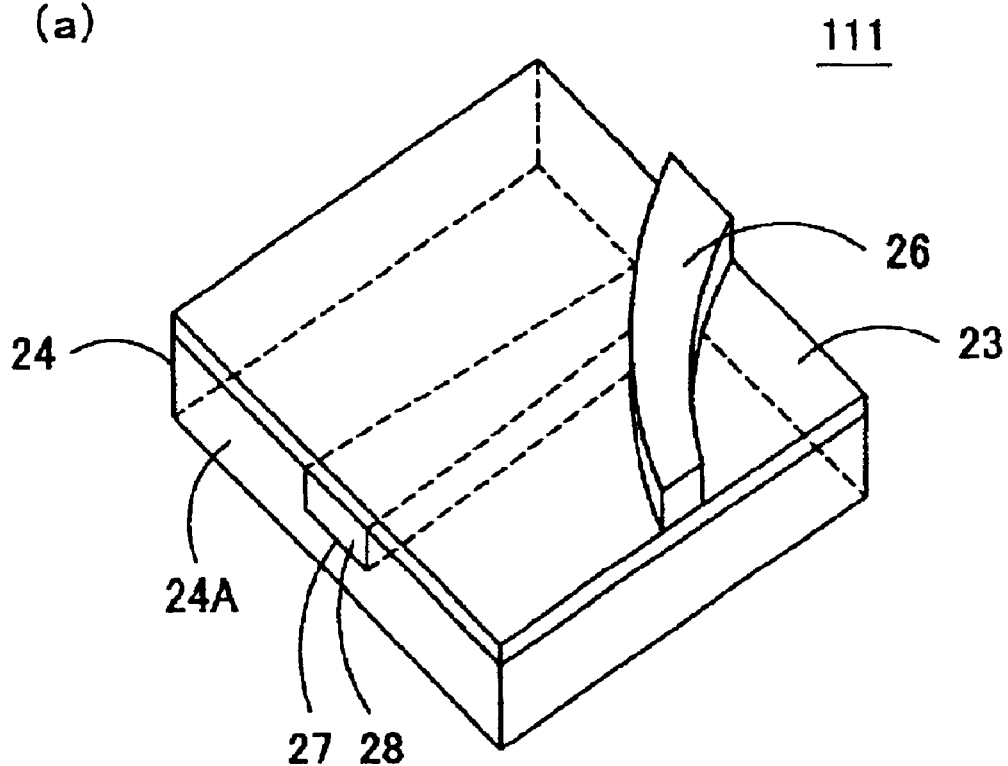
FIGS. 27A and 27B are a perspective view and a front view, respectively, of an optical device according to a 17th embodiment of the invention.
Figure 27:
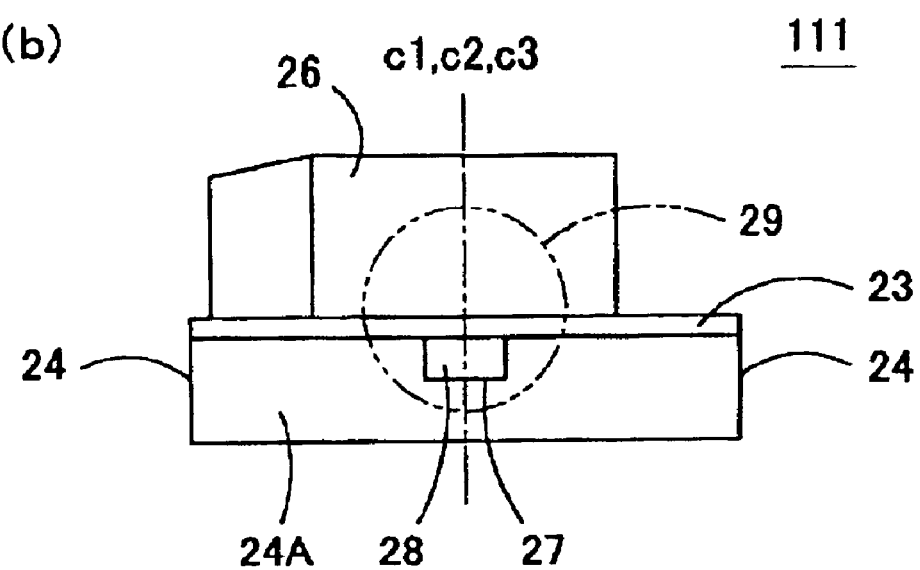

FIG. 27A is a perspective view of an optical device 111 according to a 17th embodiment of the invention. In the optical device 111, only a receiving light guide (core) 26 is formed on a sending-side substrate 24 with a cladding layer 23 interposed in between. The sending-side substrate 24 is produced in such a manner that a tapered sending light guide 28 is formed in a substrate 24A by filling a straight groove 27 of the substrate 24A with a core material. The receiving light guide 26 extends across the sending-side substrate 24 and is curved. The receiving light guide 26 is tapered in such a manner that its light incident face is wide and the receiving light guide 26 becomes thinner gradually toward its light exit face. The light incident face of the receiving light guide 26 and the light exit face of the sending light guide 28 are located adjacent to each other in the direction perpendicular to the sending-side substrate 24, and the light exit face of the receiving light guide 26 is located in the plane containing the surface of the substrate 24A that is different from the surface where the light incident face of the sending light guide 28 is located.

In the end surface of the sending-side substrate 24 where the end faces of the receiving light guide 26 and the sending light guide 28 are located adjacent to each other in the direction perpendicular to the sending-side substrate 24, as shown in FIG. 27B, the end faces of the receiving light guide 26 and the sending light guide 28 are arranged in such a manner that the central axis c1 of the end face of the receiving light guide 26 that is perpendicular to the sending-side substrate 24 and the central axis c2 of the sending light guide 28 that is perpendicular to the sending-side substrate 24 approximately coincide with each other. An optical fiber 29 is coupled with the receiving light guide 26 and the sending light guide 28 in such a manner that the central axis c3 of the end face of the optical fiber 29 that is perpendicular to the sending-side substrate 24 approximately coincides with the central axes c1 and c2 of the end faces of the receiving light guide 26 and the sending light guide 28. Although in FIG. 27B the central axes c1–c3 approximately coincide with each other, the central axis c1 may be deviated from the central axes c2 and c3 if the area of the light incident face of the receiving light guide 26 that is coupled with the optical fiber 29 is sufficiently larger than the area of the end face of the optical fiber 29 and hence there is no possibility that part of the end face of the optical fiber 29 goes out of the light incident face of the receiving light guide 26 when projected to the latter.

In the optical device 111, since the receiving light guide 26 is adjacent to the air cladding layer except for its bottom surface, the receiving light guide 26 can be bent to a large extent while the light transmission loss in the receiving light guide 26 is reduced.

Embodiment 18

Figure 28:
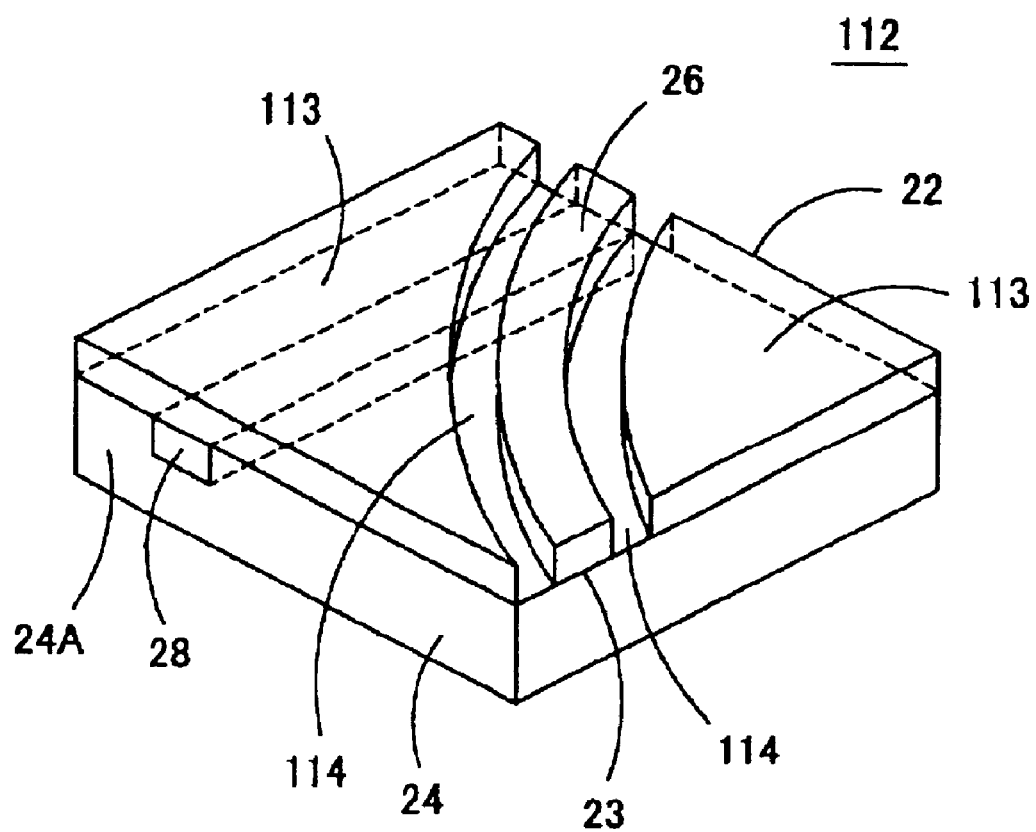
FIG. 28 is a perspective view of an optical device according to an 18th embodiment of the invention.

FIG. 28 is a perspective view of an optical device 112 according to an 18th embodiment of the invention. In the optical device 112, a reception-side substrate 22 is placed, with a cladding layer 23 interposed in between, on a sending-side substrate 24 in which a sending light guide 28 is buried. The reception-side substrate 22 consists of a receiving light guide 26 that extends across the surface of the sending-side substrate 24 and is curved and runner portions 113 (passageways of resin at the time of molding) that are disposed inside and outside the receiving light guide 26 with gaps 114 formed in between, respectively. One end face of the receiving light guide 26 and one end face of the sending light guide 28 are located adjacent to each other in the direction perpendicular to the substrates 22 and 24, and the other end face of the receiving light guide 26 is located in the plane containing the surface of a substrate 24A that is different from its surface where the other end face of the sending light guide 28 is located.

The receiving light guide 26 and the runner portions 113 are molded by injection molding so as to be integrated with each other. Before they are bonded to the sending-side substrate 24 (at the time of molding), the receiving light guide 26 and the land portions 113 between which the gaps 114 exist are connected to each other by runner portions (not shown). After the receiving light guide 26 and the runner portions 113 are bonded to the sending-side substrate 24, the runner portions not shown in FIG. 28 and unnecessary portions of the sending-side substrate 24 are cut away, whereby the receiving light guide 26 and the runner portions 113 are separated from each other.

Also in the optical device 112, since the receiving light guide 26 has the air cladding layer except for its bottom surface, the receiving light guide 26 can be bent to a large extent while the light transmission loss in the receiving light guide 26 is reduced. Further, before the receiving light guide 26 and the runner portions 113 are bonded to the sending-side substrate 24, the small receiving light guide 26 can be handled together with the runner portions 113 as part of a large member, which contributes to increase in the productivity of the optical device 112. In addition, since the runner portions 113 are left on the sending-side substrate 24, a step of removing the unnecessary runner portions 113 can be omitted, which contributes to cost reduction of the optical device 112.

It can be said that the embodiments of FIGS. 17 and 19 are embodiments in which a runner portion is left on the substrate.

Figure 29:
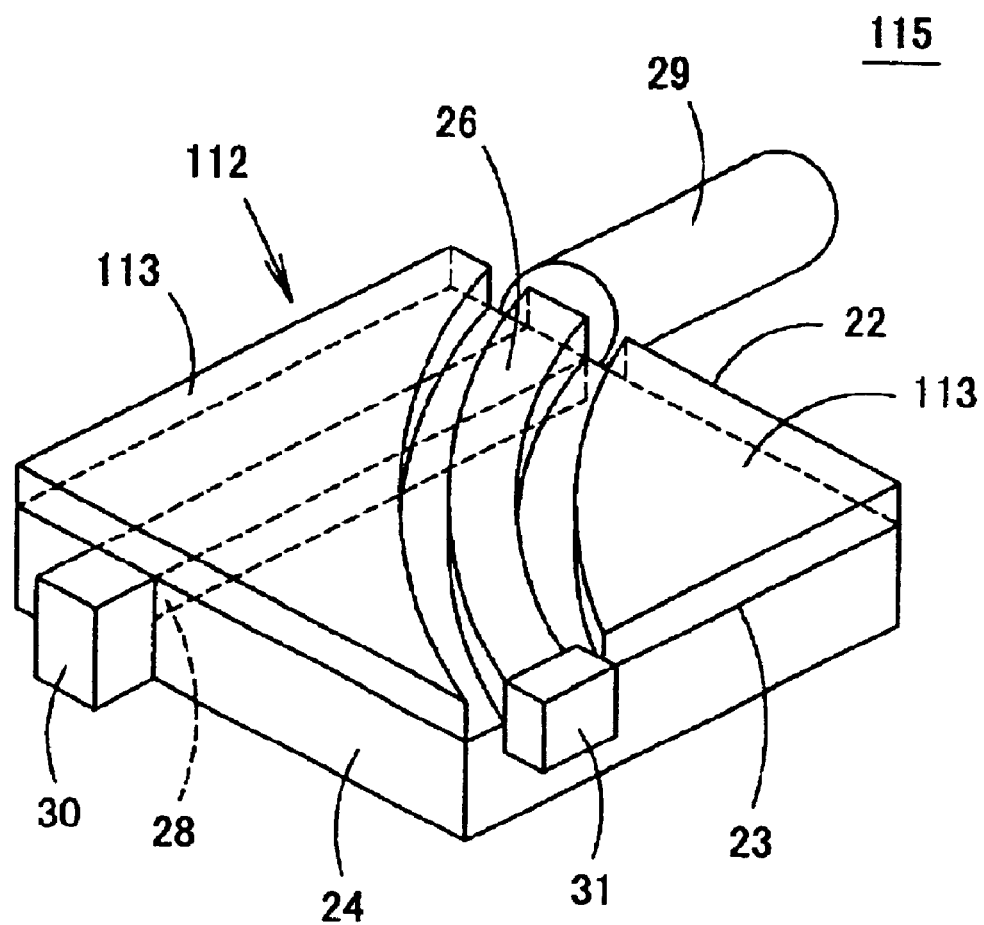
FIG. 29 is a perspective view of an optical transceiver using the optical device of FIG. 28.

FIG. 29 is a perspective view of an optical transceiver 115 using the above-described optical device 112. In the optical transceiver 115, on the optical-fiber-coupling end surface, an end face of optical fiber 29 is joined to the adjacent end faces of the receiving light guide 26 and the sending light guide 28. A light-receiving element 31 is so disposed as to be opposed to the other end face of the receiving light guide 26. A light input element 30 is so disposed as to be opposed to the other end face of the sending light guide 28.

Embodiment 19

Figure 30:
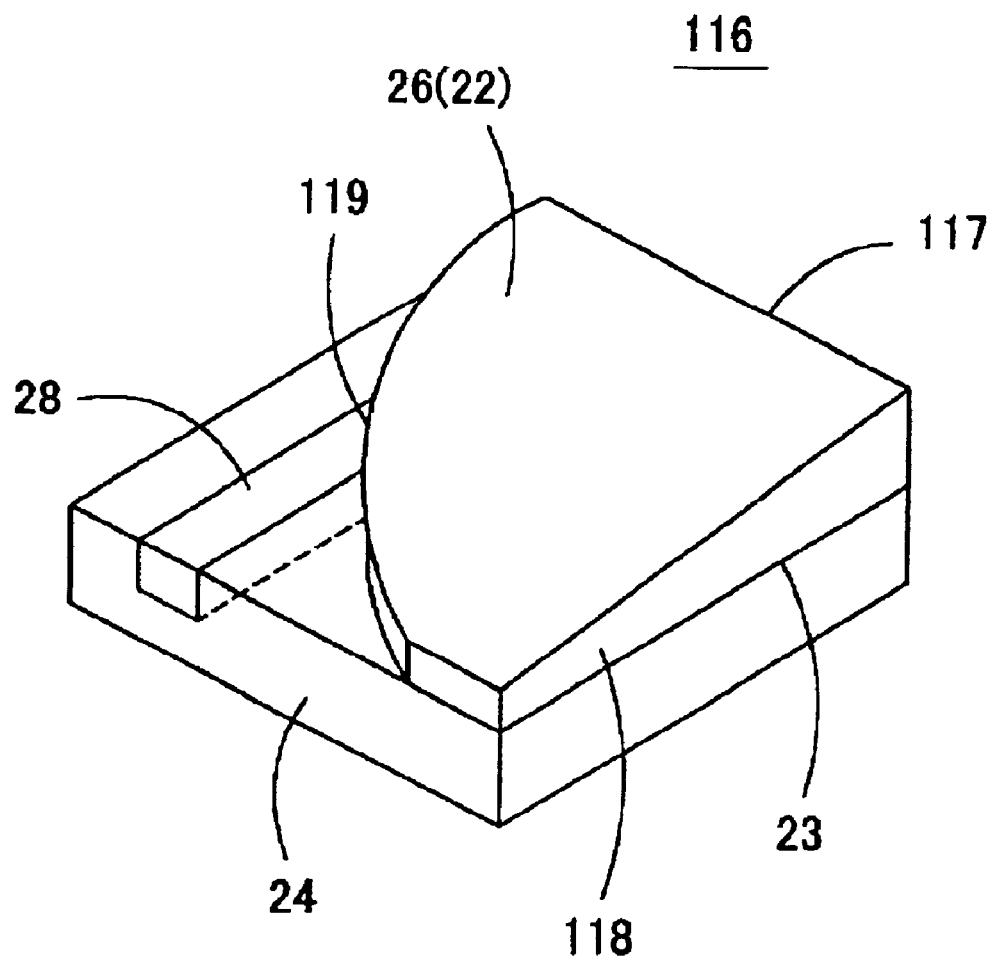
FIG. 30 is a perspective view of an optical device according to a 19th embodiment of the invention.

FIG. 30 is a perspective view of an optical device 116 according to a 19th embodiment of the invention. In the optical device 116, a receiving light guide 26 (reception-side substrate 22) is placed, with a cladding layer 23 interposed in between, on a sending-side substrate 24 in which a sending light guide 28 is buried. The receiving light guide 26 is made of a core material and assumes a plate-like shape. The receiving light guide 26 assumes a prism-like shape in a plan view, and has two side surfaces (a light incident surface 117 and a light exit surface 118) that are perpendicular to each other and a curved side surface (a light reflection surface 119). Further, the receiving light guide 26 assumes a wedge-like shape; that is, its thickness is greatest at the reception signal incident surface (light incident surface 117) and gradually decreases toward the surface opposite to the reception signal incident surface.

Figure 31:
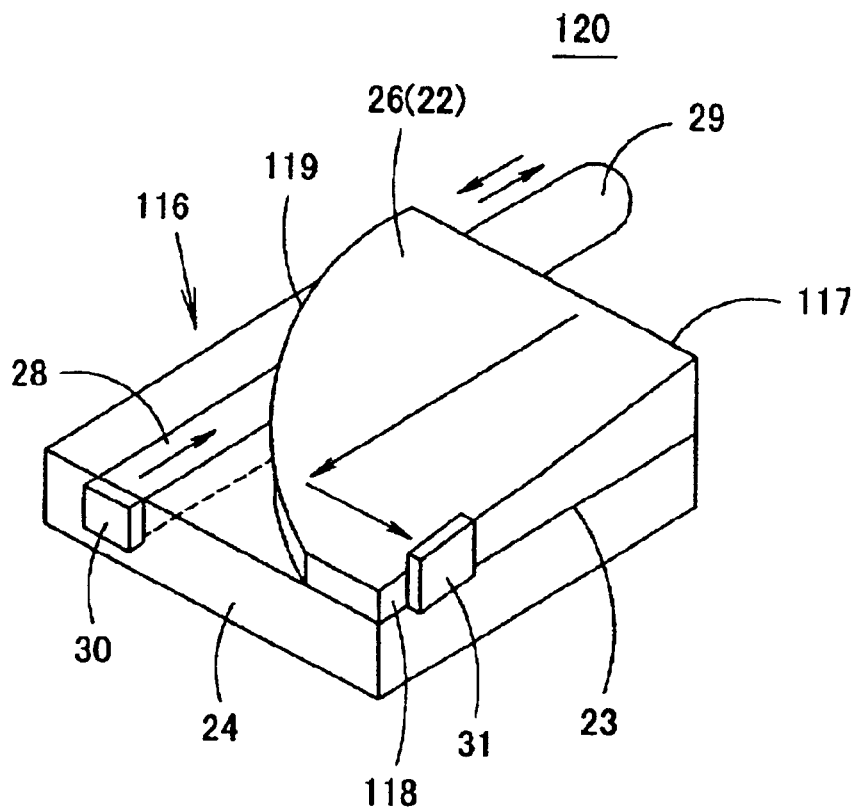
FIG. 31 is a perspective view of an optical transceiver using the optical device of FIG. 30.

FIG. 31 is a perspective view of an optical transceiver 120 using the optical device 116. In the optical transceiver 120, a light input element 30 is so disposed as to be opposed to the light incident face (having a larger area) of the sending light guide 28 and a light-receiving element 31 is so disposed as to be opposed to the light exit surface 118 of the receiving light guide 26.

In the optical transceiver 120, as shown in FIG. 31, light that is output from the light input element 30 travels through the sending light guide 28 and enters an optical fiber 29 from the light exit face of the sending light guide 28. On the other hand, light that has been transmitted through the optical fiber 29 and output from its end face enters the receiving light guide 26 from the light incident surface 117 and travels through the receiving light guide 26 while being totally reflected by the top surface and the bottom surface of the receiving light guide 26 repeatedly. If the light impinges on the light reflection surface 119 during that course, it is totally reflected by the light reflection surface 119 and its traveling direction is changed by about 90°. The reflected light is output from the light exit surface 118 and received by the light-receiving element 31.

Figure 32:
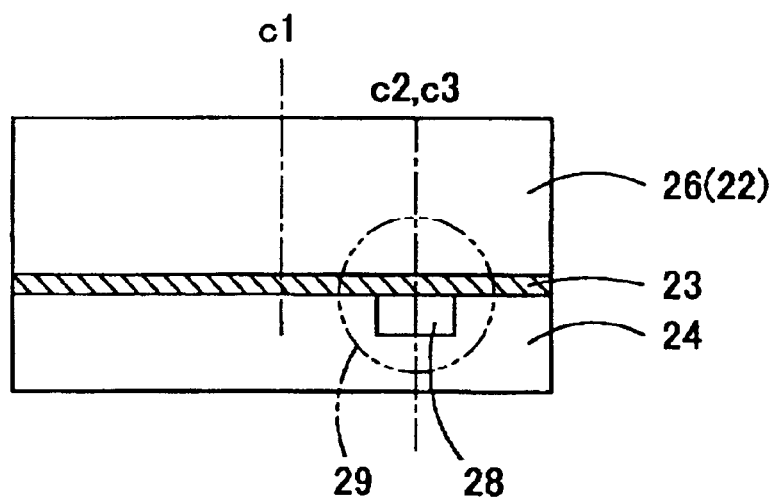
FIG. 32 shows a positional relationship among the end faces of a receiving light guide, a sending light guide, and an optical fiber in the optical transceiver of FIG. 31.

As shown in FIG. 32, in the region where the light exit face of the sending light guide 28 and part of the light incident surface 117 of the receiving light guide 26 coextend, the end face of the optical fiber 29 is coupled with the optical device 116 in such a manner that the central axis c2 perpendicular to the sending-side substrate 24 of the light exit face of the sending light guide 28 approximately coincides with the central axis c3 perpendicular to the sending-side substrate 24 of the end face of the optical fiber 29. In the optical device 116, the width of the light incident surface 117 of the receiving light guide 26 is almost equal to the width of a substrate 24A. Therefore, the only requirement is that the central axis c2 of the light exit face of the sending light guide 28 coincide with the central axis c3 of the end face of optical fiber 29 as described above; it is not necessary to pay much attention to the central axis c1 of the light incident surface 117 of the receiving light guide 26. As shown in FIG. 32, the central axis c1 of the light incident surface 117 of the receiving light guide 26 may deviate from the central axis c2 of the light exit face of the sending light guide 28 and the central axis c3 of the end face of the optical fiber 29. Therefore, the positions of the optical fiber 29 and the sending light guide 28 are not restricted to the center of the receiving light guide 26 and hence can easily be adjusted to a position corresponding to the light input element 30. This makes it possible to relax management conditions of manufacture.

Embodiment 20

Figure 33:
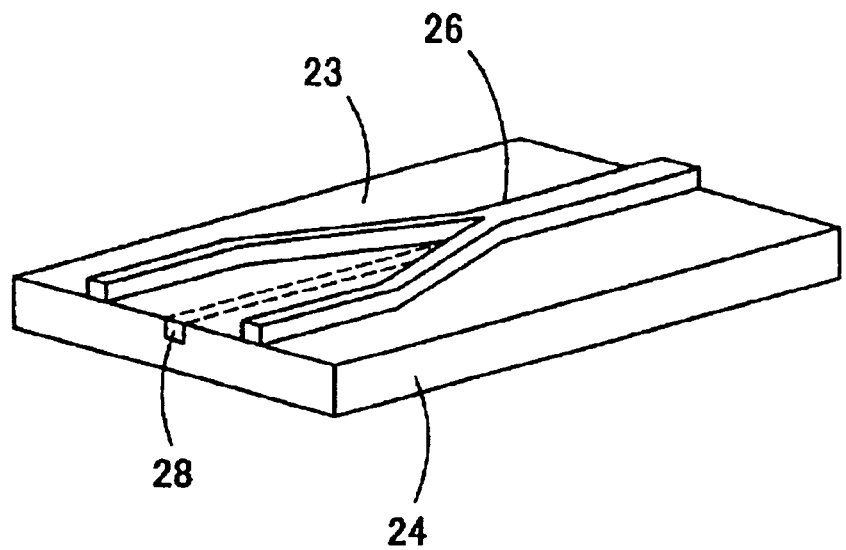
FIG. 33 is a perspective view of an optical device according to a 20th embodiment of the invention.

FIG. 33 is a perspective view of an optical device 122 according to a 20th embodiment of the invention. In the optical device 122, a receiving light guide 26 having two or more branches, for example, a Y-shaped receiving light guide 26 is placed, with a cladding layer 23 interposed in between, on a sending-side substrate 24 in which a straight sending light guide 28 is buried. The light exit face of the sending light guide 28 is located adjacent to the light incident face of the receiving light guide 26 (the receiving light guide 26 is not branched on this side) in the direction perpendicular to the sending-side substrate 24. That is, the receiving light guide 26 is adjacent to air cladding except for its bottom surface.

An optical transceiver is formed by using the optical device 122 having the above structure in such a manner that a light input element 30 is so disposed as to be opposed to the light incident face of the sending light guide 28, a plurality of light-receiving elements are so disposed as to be opposed to the light exit faces of the branches of the receiving light guide 26, and an optical fiber is coupled with the end surface where the light exit face of the sending light guide 28 and the light incident face of the receiving light guide 26 are located adjacent to each other. A transmission signal that is output from the light input element travels through the sending light guide 28. On the other hand, a reception signal that is output from the optical fiber enters the receiving light guide 26 and branched therein, and branched reception signals are received by the respective light-receiving elements.

Embodiment 21

Figure 34:
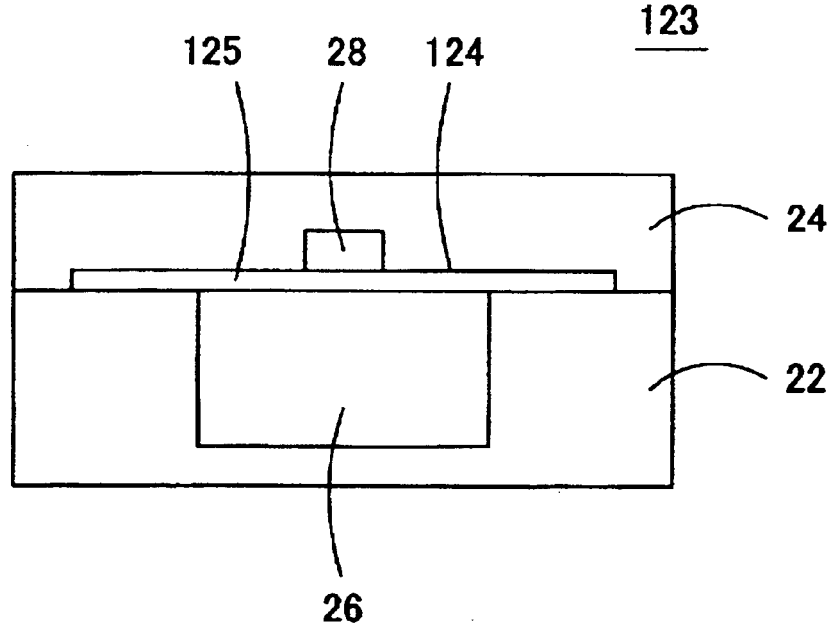
FIG. 34 is a sectional view of an optical device according to a 21st embodiment of the invention.

FIG. 34 is a sectional view of an optical device 123 according to a 21st embodiment of the invention. In the optical device 123, a sending-side substrate 24 is placed on a reception-side substrate 22. The bottom surface of the sending-side substrate 24 is formed with a recess 124 in a region corresponding to at least the receiving light guide 26 or the sending light guide 28. An air cladding layer (isolation layer) 125 is formed by the presence of the recess 124. The air cladding layer 125 isolates the receiving light guide 26 and the sending light guide 28 from each other and thereby prevents leakage of light and crosstalk (when optical device 123 is used in an optical transceiver or the like).

Embodiment 22

Figure 35:
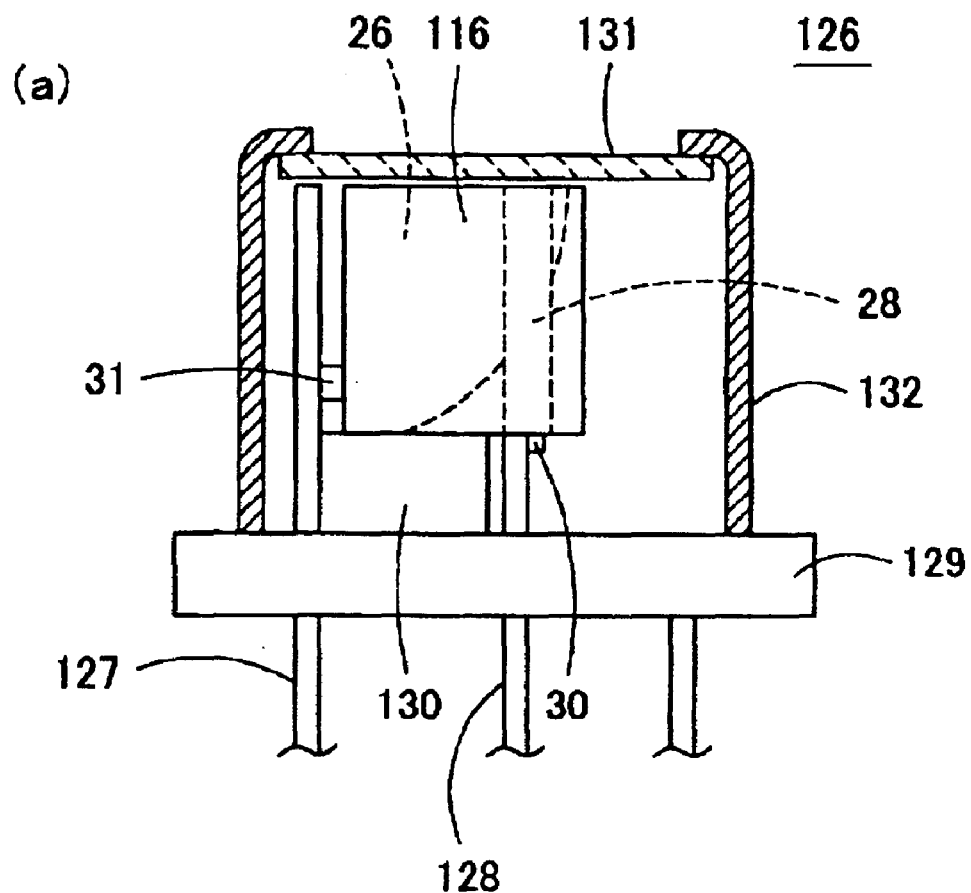
FIGS. 35A and 35B are a sectional view and a plan view (a cover glass is removed), respectively, of a hologram unit of an optical pickup according to a 22nd embodiment of the invention.
Figure 35:
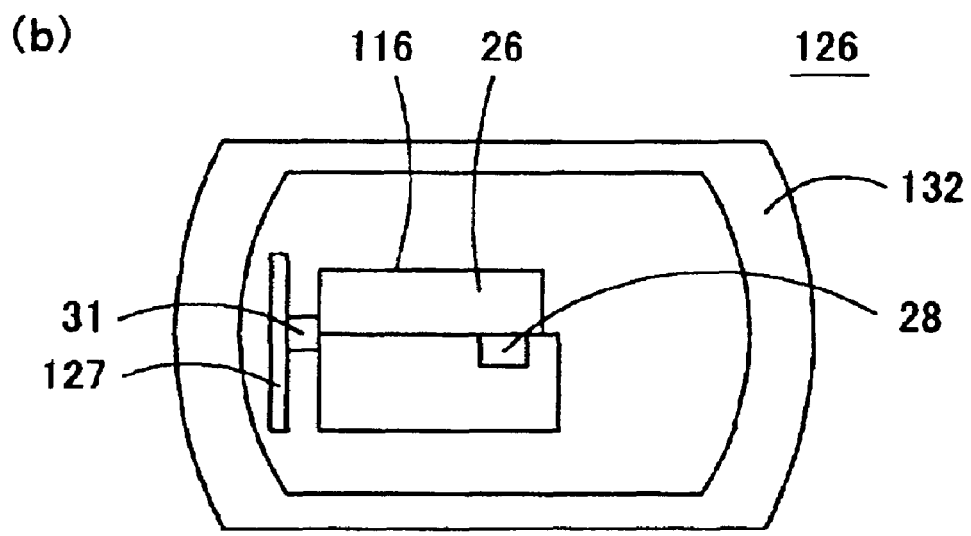

FIGS. 35A and 35B are a sectional view and a plan view (a cover glass 131 is removed), respectively, of a hologram unit 126 of an optical pickup according to a 22nd embodiment of the invention. In the hologram unit 126, a support stage 130 is mounted on a base 129 in which lead frames 127 and 128 are inserted. The optical device 116 of FIG. 30, for example, is mounted on the support stage 130 in such a manner that the light incident face of the receiving light guide 26 is up. A light-receiving element 31 that is mounted on the lead frame 127 is opposed to the light exit face of the receiving light guide 26, and a light input element 30 that is mounted on the lead frame 128 is opposed to the light incident face of the sending light guide 28. The optical device 116, the light input element 30, and the light-receiving element 31 are covered with a can case 132 having an opening to whose periphery the cover glass 131 is bonded, and are sealed between the can case 132 and the base 129. The hologram unit 126 can output light that is output from the light input element 30 and supplied to the hologram unit via the sending light guide 28. Further, light that returns to the hologram unit 126 can be captured by the receiving light guide 26 and received by the light-receiving element 31.

Embodiment 23

Figure 36:
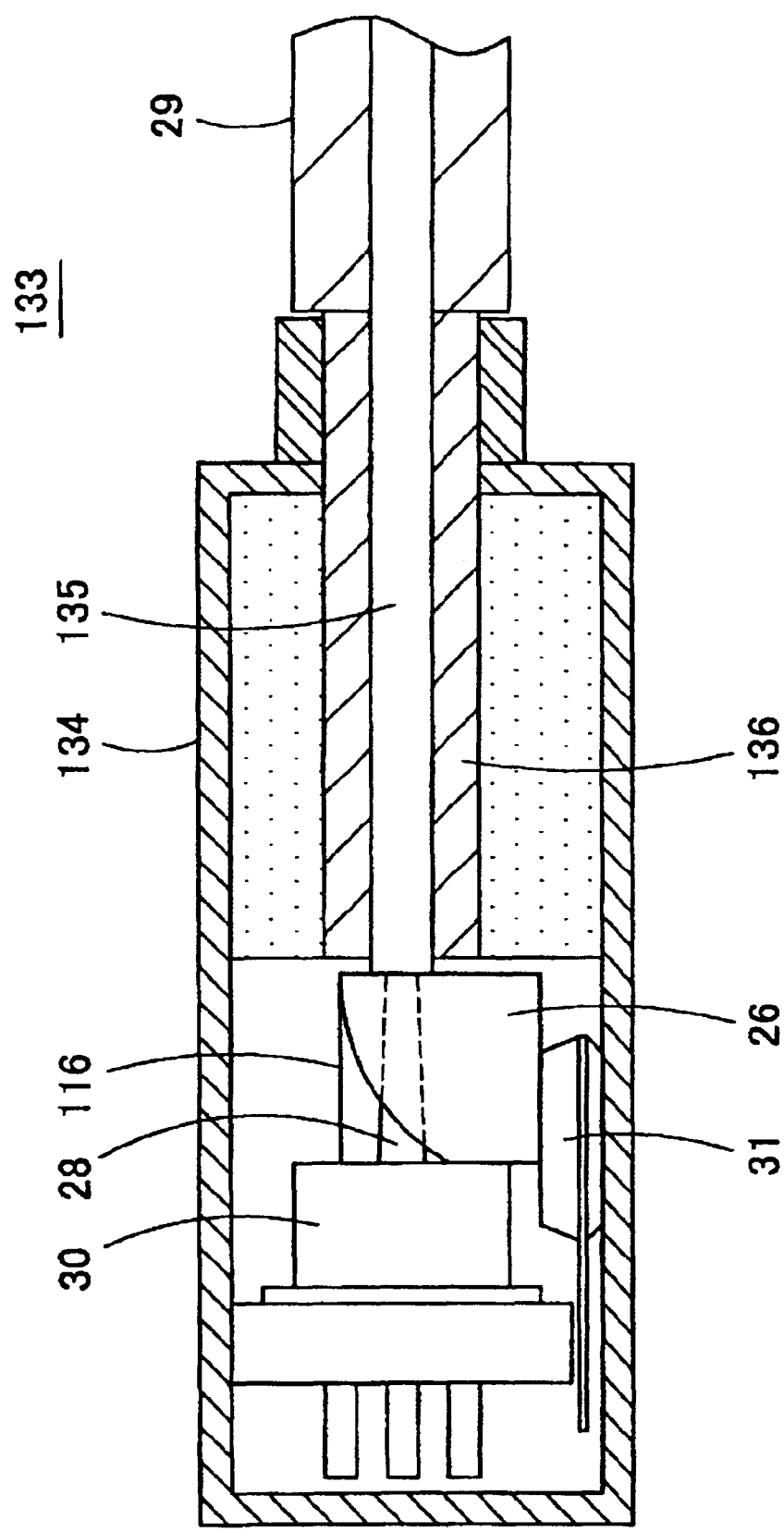
FIG. 36 is a sectional view of an optical transceiver according to a 23rd embodiment of the invention.

FIG. 36 is a sectional view of an optical transceiver 133 according to a 23rd embodiment of the invention. In the optical transceiver 133, the optical device 116 of FIG. 30, for example, is provided in a case 134. A light input element 30 which, in this embodiment, is a "can-package type" is mounted so as to be opposed to the light incident side of the sending light guide 28 of the optical device 116, and a light-receiving element 31 is mounted so as to be opposed to the light exit face of the receiving light guide 26. A fiber core 135 of an optical fiber 29 that is exposed by removing the coating is inserted in a sleeve 136 of the case 134, and the end face of the fiber core 135 is coupled with the end faces of the receiving light guide 26 and the sending light guide 28. In the optical transceiver 133 the light input element 30 and light-receiving element 31 can be coupled with the optical fiber 29 via the optical device 116.

Embodiment 24

Figure 37:
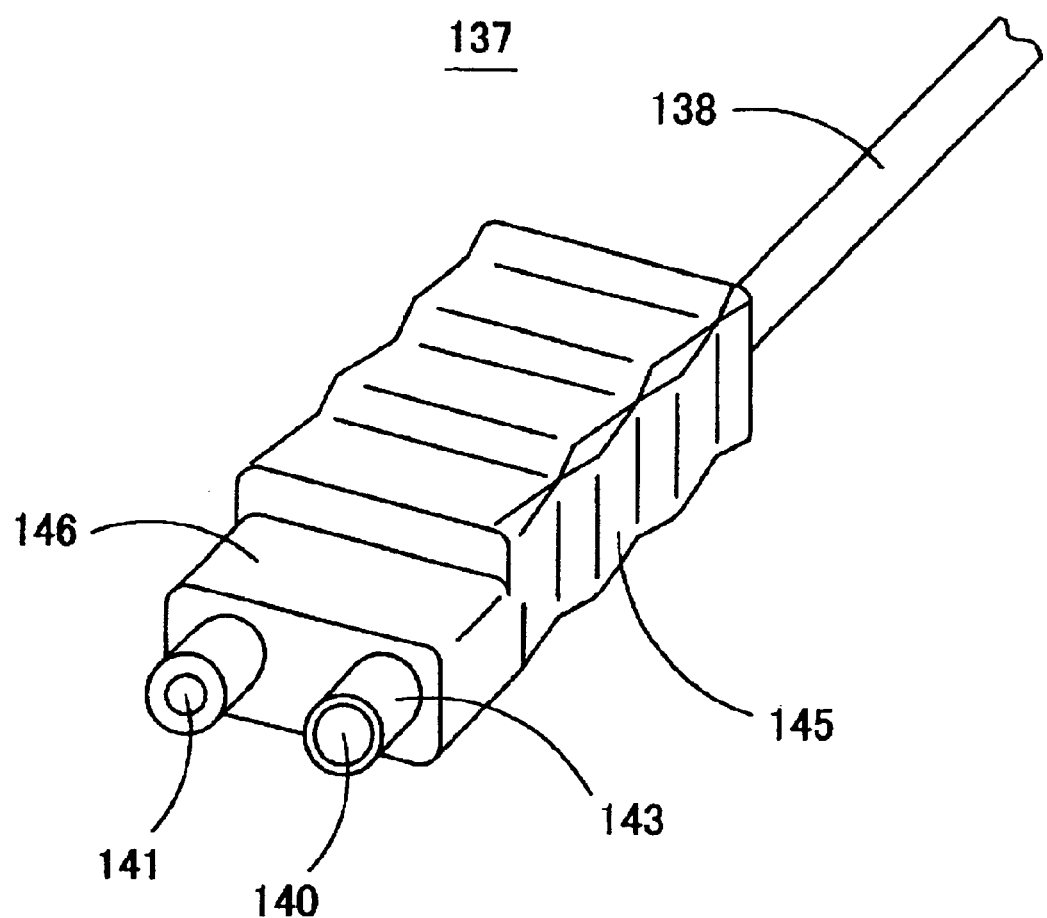
FIGS. 37 and 38 are a perspective view and an enlarged sectional view, respectively, of a connector using an optical device 21A according to a 24th embodiment of the invention.
Figure 38:
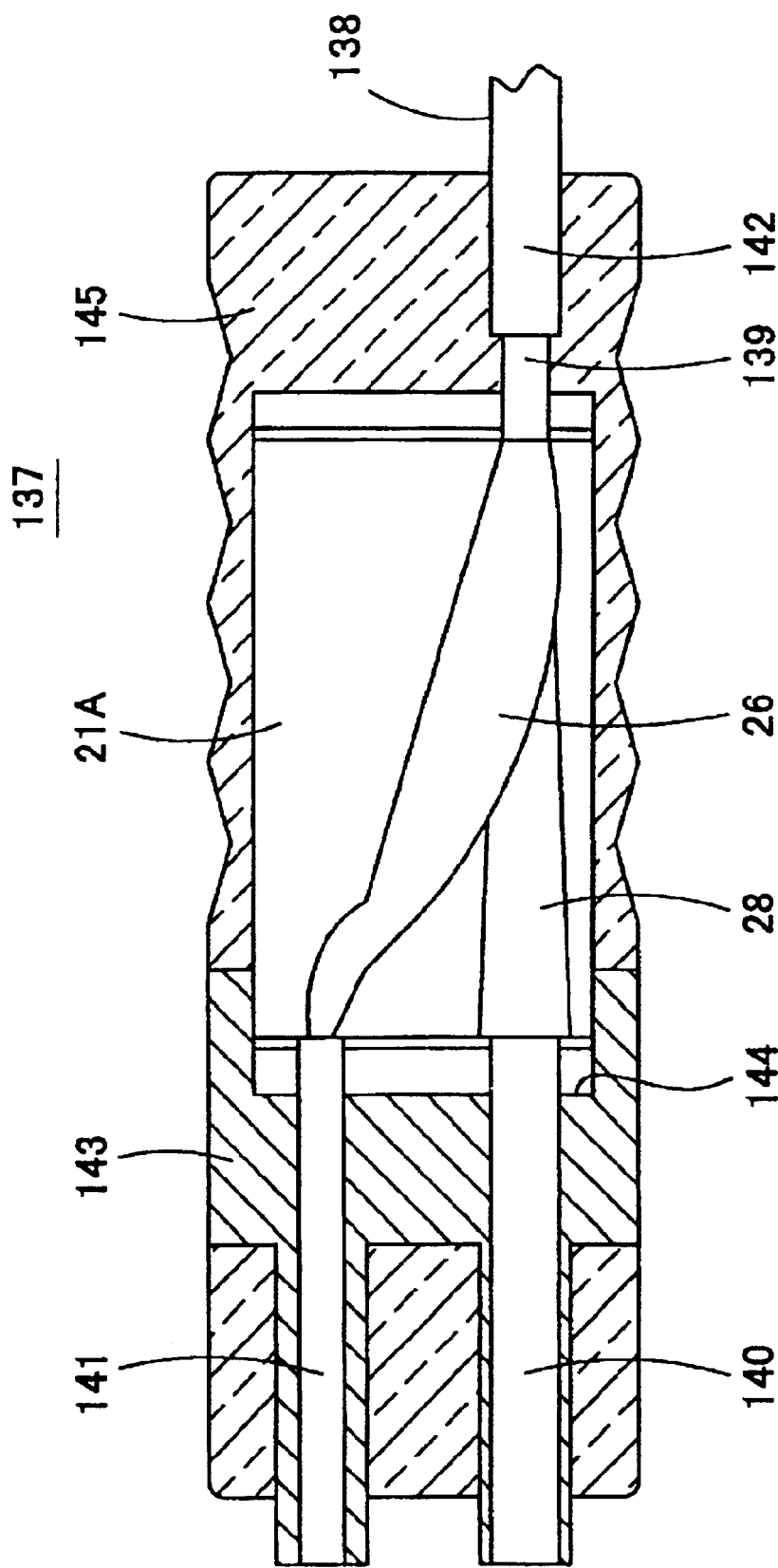

FIGS. 37 and 38 are a perspective view and a sectional view, respectively, of a connector 137 using an optical device 21A according to the invention. For example, the connector 137 uses the optical device 21A according to the first embodiment. That is, in the optical device 21A, the sending light guide 28 is tapered and the smaller end face of the sending light guide 28 and one end face of the receiving light guide 26 are located adjacent to each other with the cladding layer 23 interposed in between. A single fiber transmission line 138 is coupled with the end surface of the optical device 21A where the end faces of the sending light guide 28 and the receiving light guide 26 are located adjacent to each other. The fiber transmission line 138 is formed by covering a plastic optical fiber 139 with a coating 142. The tip face of a portion of the optical fiber 139 that is exposed by removing the coating 142 is opposed to the end faces of the sending light guide 28 and the receiving light guide 26.

The end face of an optical fiber 140 is coupled with the larger end face of the sending light guide 28 (the area of the former is smaller than that of the latter). The end face of an optical fiber 141 is coupled with the other end face of the receiving light guide 26 (the area of the former is larger than that of the latter). The outer circumferential surfaces of the optical fibers 140 and 141 are covered with a sleeve member 143. The end faces of the optical fibers 140 and 141 are exposed from the sleeve member 143. The sleeve member 143 has a recess 144. By fitting the end portion of the optical device 21A into the recess 144, the sleeve member 143 and hence the optical fibers 140 and 141 are positioned with respect to the optical device 21A.

The optical device 21A, the tip portion of the fiber transmission line 138, and parts of the sleeve member 143 are covered with a resin coating member 145. Tip portions of the sleeve member 143 project from the tip surface of the resin coating member 145, and have the exposed end faces of the optical fibers 140 and 141, respectively. The tip portion of the resin coating member 145 has a fitting portion 146 to be mechanically fitted into a corresponding connector.

Figure 39:
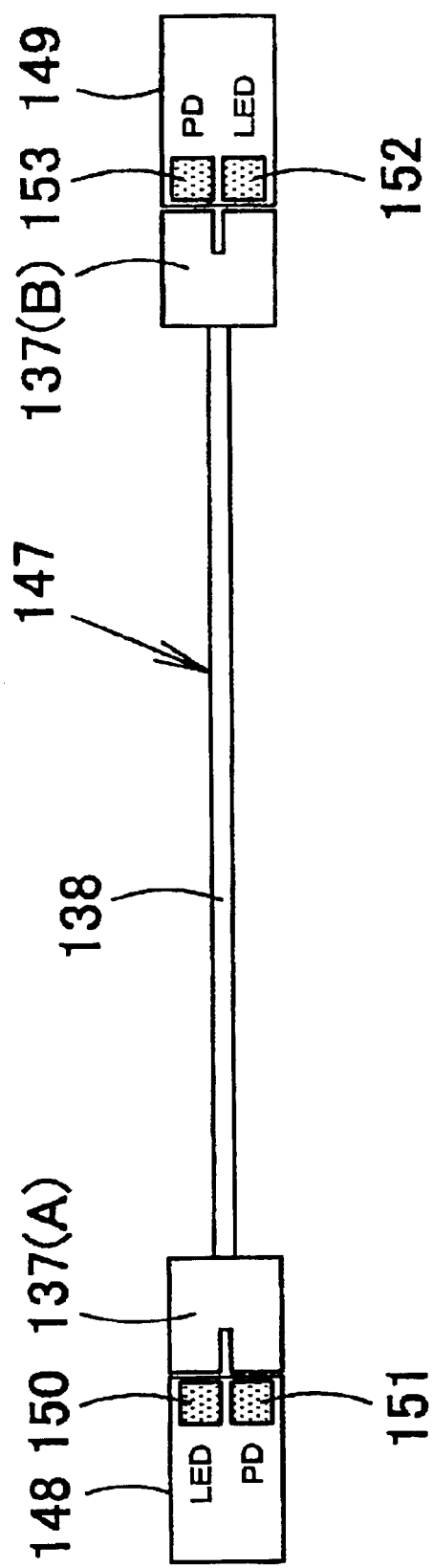
FIG. 39 is an explanatory view showing a single-core connection cord having connectors of FIGS. 37 and 38 at both ends connects optical transceivers of two apparatuses.

FIG. 39 shows a connection cord (cable) 147 in which connectors 137 each having the above structure are provided at both ends of a fiber transmission line 138. In FIG. 39, the connection cord 147 is used for connecting optical transceivers 148 and 149 of two different apparatuses. One connector 137(A) is connected to a connector (not shown) that is provided in the optical transceiver 148 (or the apparatus incorporating the optical transceiver 148), and the other connector 137(B) is connected to a connector (not shown) that is provided in the optical transceiver 149. An optical signal that is sent from a light input element 150 of the optical transceiver 148 is supplied to the fiber transmission line 138 via the connector 137(A), reaches the connector 137(B) after traveling through the fiber transmission line 138, and is finally received by a light-receiving element 153 of the optical transceiver 149. On the other hand, an optical signal that is sent from a light input element 152 of the optical transceiver 149 is supplied to the fiber transmission line 138 via the connector 137(B), reaches the connector 137(A) after traveling through the fiber transmission line 138, and is finally received by a light-receiving element 151 of the optical transceiver 148.

Figure 40:
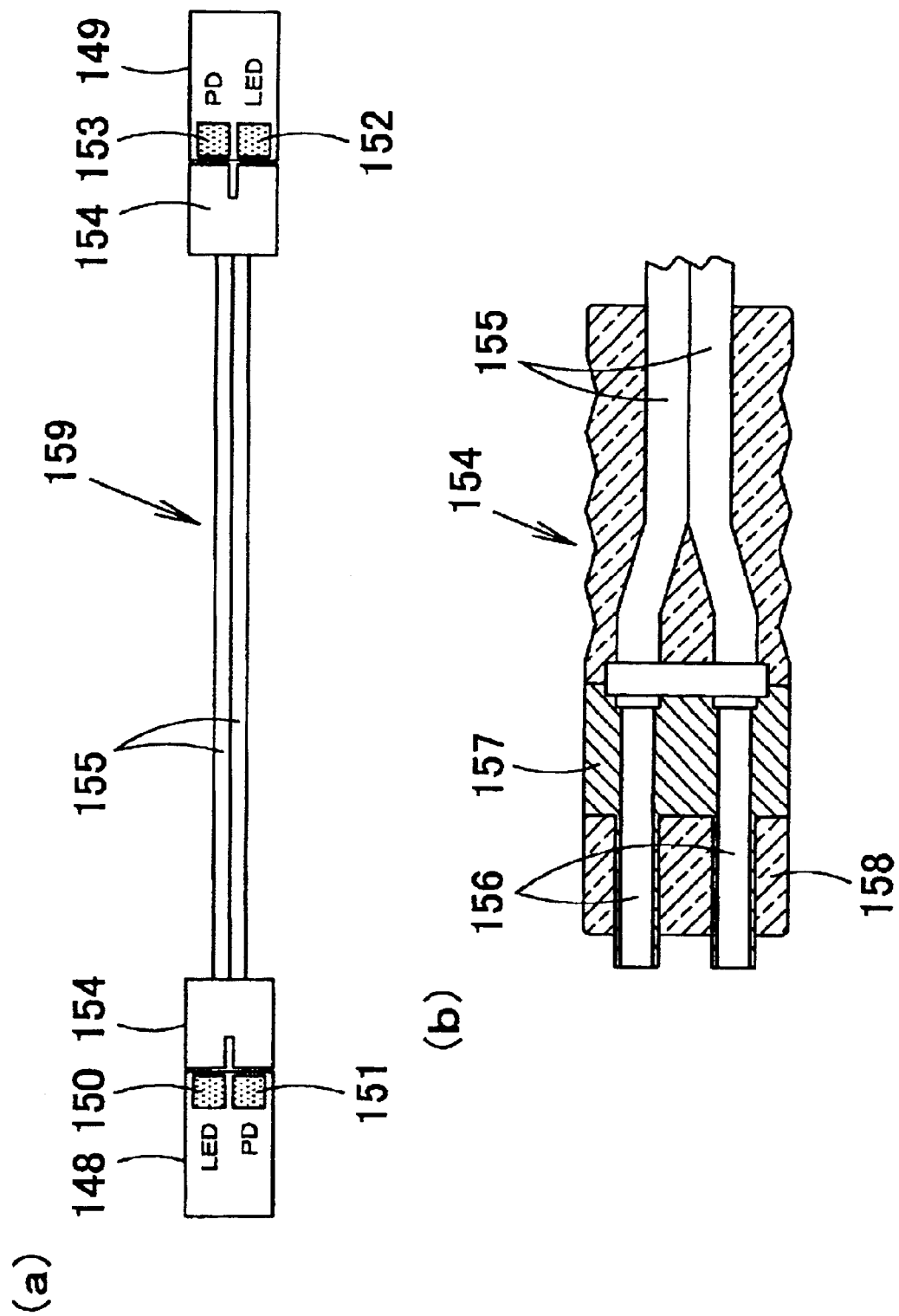
FIG. 40A is a schematic diagram showing the structure of a conventional twin-core connection cord for connecting optical transceivers of two apparatuses.
FIG. 40B is a sectional view of a connector used in the conventional connection cord of FIG. 40A.

In a conventional connector 154, as shown in FIG. 40B, tip portions of optical fibers 156 are exposed by removing the coatings of two fiber transmission lines 155. The tip portions of optical fibers 156 are covered with a sleeve member 157, which is covered with a resin coating member 158. As shown in FIG. 40A, a twin-core connection cord 159 in which connectors 154 having the above structure are provided at both ends of two fiber transmission lines 155 connects optical transceivers 148 and 149. That is, one fiber transmission line 155 directly connects the light input element 150 of the optical transceiver 148 and the light-receiving element 153 of the optical transceiver 149 and the other fiber transmission line 155 directly connects the light input element 152 of the optical transceiver 149 and the light-receiving element 151 of the optical transceiver 148.

Therefore, to connect the optical transceivers 148 and 149 each having the light input element and the light-receiving element, the conventional method requires the twin-core connection cord 159. In contrast, the connectors 137 of the invention make it possible to connect the optical transceivers 148 and 149 by the single-core transmission line 138. This lowers the cost of the connection cord 147. Further, the connection cord 147 does not occupy a large space in winding and storing it when it is not used.

If the light input elements and the light-receiving elements of the optical transceivers 148 and 149 were connected to each other by two optical fibers, each connector 137 would also serve as a twin core/single core conversion adapter.

Figure 41:
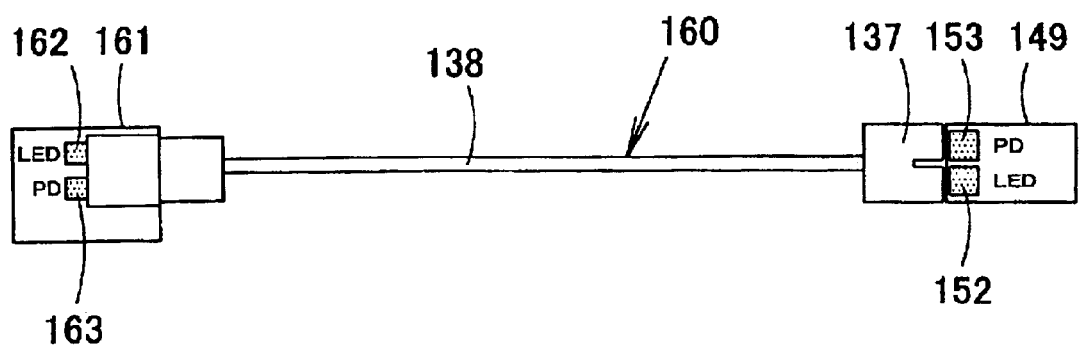
FIG. 41 is a schematic diagram showing a single-core connection cord in which an optical transceiver is provided at one end and a connector is provided at the other end.

FIG. 41 shows a connection cord 160 in which the above-described connector 137 is provided at one end of a single-core fiber transmission line 138 and an optical transceiver 161 (e.g., the optical transceiver 21 of FIG. 4) is provided at the other end. With this structure, the connector 137 can be omitted at one end of the fiber transmission line 138, whereby the cost can be lowered. Further, bidirectional communication can be performed between the light input element 162 and the light-receiving element 163 of the optical transceiver 161 and the light-receiving element 153 and the light input element 152 of the optical transceiver 149. In addition, the optical transceivers 161 and 149 can be separated from each other by removing the connector 137 from the optical transceiver 149.

Embodiment 25

Figure 42:
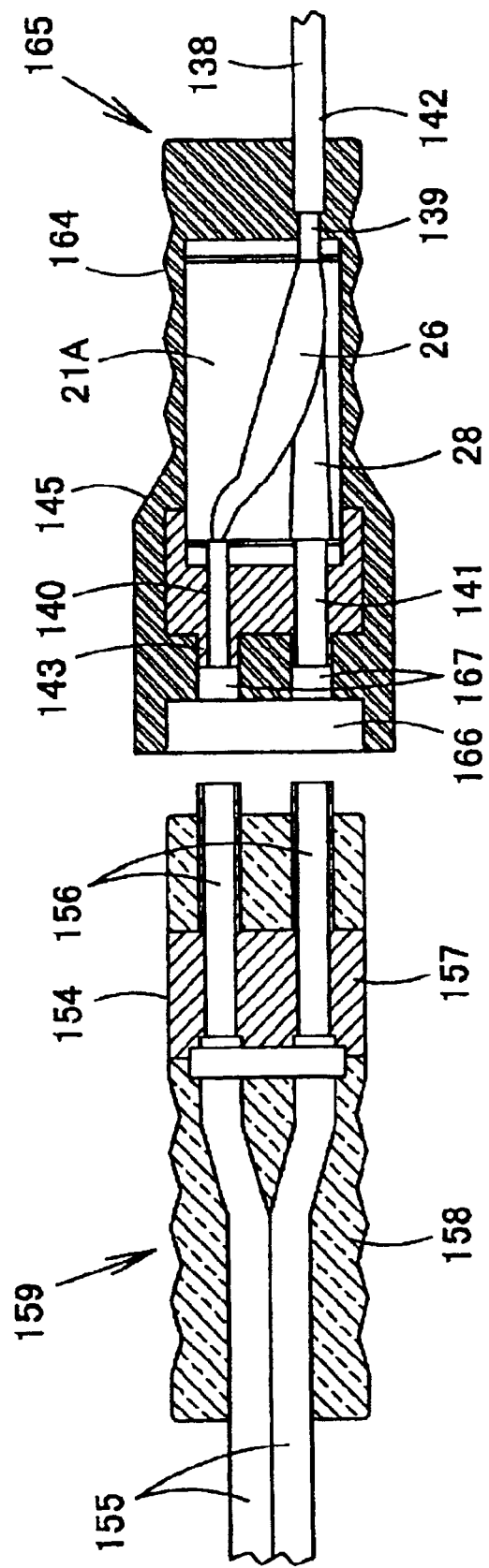
FIG. 42 is a sectional view of a single-core connection cord according to a 25th embodiment of the invention which has a twin core/single core conversion adapter at one end.

FIG. 42 shows a single-core connection cord 165 having, at one end, a twin core/single core conversion adapter 164 for connecting a twin-core connection cord 159 to a single-core connection cord. A connector 154 that is provided at the end of the twin-core connection cord 159 is the same as the connector 154 shown in FIG. 40B. The twin core/single core conversion adapter 164 that is provided at the end of the single-core connection cord 165 is similar in structure to the connector 137 shown in FIG. 38. However, to enable connection to the connector 154, the twin core/single core conversion adapter 164 is provided with a recess 166 into which the tip portion of the connector 154 is to be inserted and holes 167 into which the tip portions of the respective optical fibers 156 is to be inserted. When the connector 154 is inserted into the recess 166 and hence is connected to the twin core/single core conversion adapter 164, the tip faces of the respective optical fibers 156 of the connector 154 are opposed to the tip faces of the respective optical fibers 140 and 141 of the twin core/single core conversion adapter 164.

By using the twin core/single core conversion adapter 164 having the above structure, the twin-core connection cord 159 can be connected to the single-core connection cord 165 and optical signals can be communicated bidirectionally by using the single-core connection cord 165.

In the above connectors and twin core/single core conversion adapters, the optical fibers 140 and 141 may be omitted. That is, a light input element and a light-receiving element may be provide in place of the optical fibers 140 and 141, or instead of the optical fibers 140 and 141 the optical fibers of the other connector or the like may be opposed to the end face of the optical waveguide.

In some embodiments, the present invention can prevent signal interference between different light guides without lowering the efficiency of light utilization. In particular, the optical devices according to the invention can prevent crosstalk when used in optical transceivers. Further, by virtue of the lamination structure, their structures as well as manufacturing processes can be simplified.

What is claimed is:

1. An optical device comprising:
a first substrate formed with a first light guide; and
a second substrate formed with a second light guide,
wherein the first substrate and the second substrate are disposed on and integrated with each other in such a manner that the first light guide and the second light guide are isolated from each other optically,
wherein surface of the first light guide and surface of the second light guide are in contact with an isolation layer, and
wherein a reflective index of the isolation layer is smaller than each of reflective indexes of the first light guide and the second light guide.

2. An optical device comprising:
a first substrate formed with a first light guide; and
a second substrate formed with a second light guide,
wherein the first substrate and the second substrate are disposed on and integrated with each other in such a manner that the first light guide and the second light guide are isolated from each other optically, and
wherein an end face of the first light guide and an end face of the second light guide are located adjacent to an isolation layer,
wherein the isolation layer comprises an air layer.

3. The optical device according to claim 1, wherein the first light guide is formed by filling, with a core material, a groove that is formed on one major surface of the first substrate, and the second light guide is formed by filling, with a core material, a groove that is formed on one major surface of the second substrate.

4. The optical device according to claim 1, wherein in an optical-fiber-coupling end surface where the end face of the first light guide and the end face of the second light guide are located adjacent to each other in the direction perpendicular to the first substrate or the second substrate, a central axis of the first light guide or the second light guide that is perpendicular to the first substrate or the second substrate approximately coincides with a central axis of an optical fiber that is perpendicular to the first substrate or the second substrate.

5. The optical device according to claim 4, wherein in the optical-fiber-coupling end surface, the central axis of the first light guide that is perpendicular to the first substrate or the second substrate approximately coincides with the central axis of the second light guide that is perpendicular to the first substrate or the second substrate.

6. The optical device according to claim 1, wherein the first light guide is a sending light guide and the second light guide is a receiving light guide.

7. The optical device according to claim 6, wherein at least part of the receiving light guide or the sending light guide is provided with a region where air is used as a cladding layer.

8. The optical device according to claim 6, wherein a light beam is coupled with a light-input-element-coupling face of the sending light guide in such a manner that a minor axis of a cross-section of the light beam is perpendicular to a joining surface of the first substrate and the second substrate.

9. An optical transceiver comprising:
an optical device, the optical device comprising:
a first substrate formed with a first light guide;
a second substrate formed with a second light guide,
wherein the first substrate and the second substrate are disposed on and integrated with each other in such a manner that the first light guide and the second light guide are isolated from each other optically,
wherein a surface of the first light guide and a surface of the second light guide are in contact with an isolation layer, and
wherein a reflective index of the isolation layer is smaller than each of reflective indexes of the first light guide and the second light guide;
a light input element disposed so as to be opposed to an end face of the first light guide; and
a light-receiving element disposed so as to be opposed to an end face of the second light guide.

10. A connector comprising:
an optical device, the optical device comprising:
a first substrate formed with a first light guide; and
a second substrate formed with a second light guide,
wherein the first substrate and the second substrate are disposed on and integrated with each other in such a manner that the first light guide and the second light guide are isolated from each other optically,
wherein a surface of the first light guide and a surface of the second light guide are in contact with an isolation layer,
wherein a reflective index of the isolation layer is smaller than each of reflective indexes of the first light guide and the second light guide, and
wherein an optical fiber that is coupled with the optical device in such a manner as to be opposed to a portion where the end face of the first light guide and the end face of the second light guide are located adjacent to each other.

11. A twin core/single core conversion adapter comprising:
an optical device, the optical device comprising:
a first substrate formed with a first light guide; and
a second substrate formed with a second light guide,
wherein the first substrate and the second substrate are disposed on and integrated with each other in such a manner that the first light guide and the second light guide are isolated from each other optically, one end face of the first light guide and one end face of the second light guide are located adjacent to an isolation layer, and a reflective index of the isolation layer is smaller than each of reflective indexes of the first light guide and the second light guide;
a first optical fiber that is coupled with the optical device in such a manner as to be opposed to a portion where the one end face of the first light guide and the one end face of the second light guide are located adjacent to each other;

a second optical fiber that is coupled with the optical device in such a manner as to be opposed to the other end face of the first light guide;

a third optical fiber that is coupled with the optical device in such a manner as to be opposed to the other end face of the second light guide; and a connecting portion to be connected to a twin-core connection cord, the connecting portion being provided at least in a coating portion where the optical device is sealed.

* * * * *